US011524667B2

United States Patent
Orlov et al.

(10) Patent No.: US 11,524,667 B2
(45) Date of Patent: Dec. 13, 2022

(54) BRAKE SYSTEMS INTEGRATED INTO VEHICLE CORNER MODULES AND METHODS OF USE THEREOF

(71) Applicant: REE AUTOMOTIVE LTD., Herzliya (IL)

(72) Inventors: Hanan Orlov, Bet-Guvrin (IL); Ahishay Sardes, Tel Aviv (IL); Tomer Segev, Tel Aviv (IL); Neta Doron, Tel Aviv (IL); Shmuel Chioclea, Tel Aviv (IL)

(73) Assignee: REE Automotive Ltd., Kibbutz Glil-Yam (IL)

( * ) Notice: Subject to any disclaimer, the term of this patent is extended or adjusted under 35 U.S.C. 154(b) by 0 days.

(21) Appl. No.: 17/521,243

(22) Filed: Nov. 8, 2021

(65) Prior Publication Data
US 2022/0055586 A1  Feb. 24, 2022

Related U.S. Application Data

(63) Continuation of application No. PCT/IB2021/055635, filed on Jun. 24, 2021.
(Continued)

(51) Int. Cl.
*B60T 8/40* (2006.01)
*B60T 8/42* (2006.01)
(Continued)

(52) U.S. Cl.
CPC .......... *B60T 8/4059* (2013.01); *B60T 8/4266* (2013.01); *B60T 13/686* (2013.01); *B60K 7/0007* (2013.01); *B60K 2007/0038* (2013.01)

(58) Field of Classification Search
CPC .... B60T 8/4031; B60T 8/4059; B60T 8/4072; B60T 8/4266; B60T 13/586; B60T 13/686; B60K 7/0007
See application file for complete search history.

(56) References Cited

U.S. PATENT DOCUMENTS 4,805,105 A * 2/1989 Weiss ........................ B60T 8/00
303/DIG. 3
5,251,971 A * 10/1993 Reinartz ............... B60T 8/4054
303/DIG. 11
(Continued)

FOREIGN PATENT DOCUMENTS

| CN | 106394153 A | * | 2/2017 | ............. B60G 13/10 |
| KR | 20150099937 A | | 9/2015 | |
| WO | WO-2021137194 A1 | * | 7/2021 | ........... B60K 17/356 |

OTHER PUBLICATIONS

Machine translation of foreign patent document KR 20150099937 (Google patents)—KR 20150099937 published on Sep. 2, 2015.
(Continued)

*Primary Examiner* — Thomas J Williams
(74) *Attorney, Agent, or Firm* — Momentum IP; Marc Van Dyke

(57) ABSTRACT

A Vehicle Corner Module (VCM) based brake system, which includes a brake actuator, adapted to regulate the rotation rate of the wheel assembled to the VCM, a fluid-based brake power source, fluidly connected to the brake actuator and adapted to provide pressurized brake fluid for operating the brake actuator, and a brake-control-circuit, functionally associated with the brake actuator and with the brake power source, and adapted to provide functional inputs to the brake actuator based on a target rotation rate profile desired for a wheel mounted on the VCM. All mechanical components of the VCM-based brake system are disposed within the VCM. The VCM-based brake system and the vehicle platform are not in fluid communication with each other.

20 Claims, 12 Drawing Sheets

Related U.S. Application Data

(60) Provisional application No. 63/043,150, filed on Jun. 24, 2020.

(51) Int. Cl.
  B60T 8/68 (2006.01)
  B60K 7/00 (2006.01)
  B60T 13/68 (2006.01)

(56) References Cited

U.S. PATENT DOCUMENTS

| | | | | |
|---|---|---|---|---|
| 5,722,744 | A * | 3/1998 | Kupfer | F16K 37/00 |
| | | | | 303/162 |
| 5,806,938 | A * | 9/1998 | Stumpe | B60T 8/00 |
| | | | | 303/166 |
| 6,030,331 | A * | 2/2000 | Zander | A47K 10/421 |
| | | | | 493/356 |
| 6,113,197 | A * | 9/2000 | Kuroki | B60T 7/042 |
| | | | | 303/11 |
| 6,623,087 | B1 * | 9/2003 | Wolff | B60T 8/326 |
| | | | | 303/166 |
| 8,104,589 | B2 * | 1/2012 | Ollat | F16D 66/02 |
| | | | | 188/161 |
| 8,682,559 | B2 | 3/2014 | Kolbe et al. | |
| 9,102,331 | B2 * | 8/2015 | Bluethmann | B62D 7/026 |
| 9,352,732 | B2 * | 5/2016 | Loos | B60W 10/184 |
| 9,494,940 | B1 | 11/2016 | Kentley | |
| 10,507,816 | B2 | 12/2019 | Kilmurray et al. | |
| 2009/0240414 | A1 * | 9/2009 | Dessouki | B60T 17/22 |
| | | | | 188/2 R |
| 2014/0303865 | A1 * | 10/2014 | Bohm | B60T 13/58 |
| | | | | 701/70 |
| 2015/0083508 | A1 | 3/2015 | Bluethmann et al. | |
| 2015/0083509 | A1 * | 3/2015 | Borroni-Bird | B60W 10/08 |
| | | | | 180/204 |
| 2019/0291797 | A1 * | 9/2019 | Richards | B62D 65/12 |
| 2021/0362695 | A1 * | 11/2021 | Sekiya | B60T 7/102 |
| 2021/0394610 | A1 * | 12/2021 | Kim | B60G 11/16 |
| 2022/0001846 | A1 * | 1/2022 | Kim | B60K 17/358 |
| 2022/0055586 | A1 * | 2/2022 | Orlov | B60T 8/4059 |

OTHER PUBLICATIONS

International search report for PCT/IB2021/055635 dated Oct. 7, 2021.
Written Opinion for PCT/IB2021/055635 dated Oct. 7, 2021.

* cited by examiner

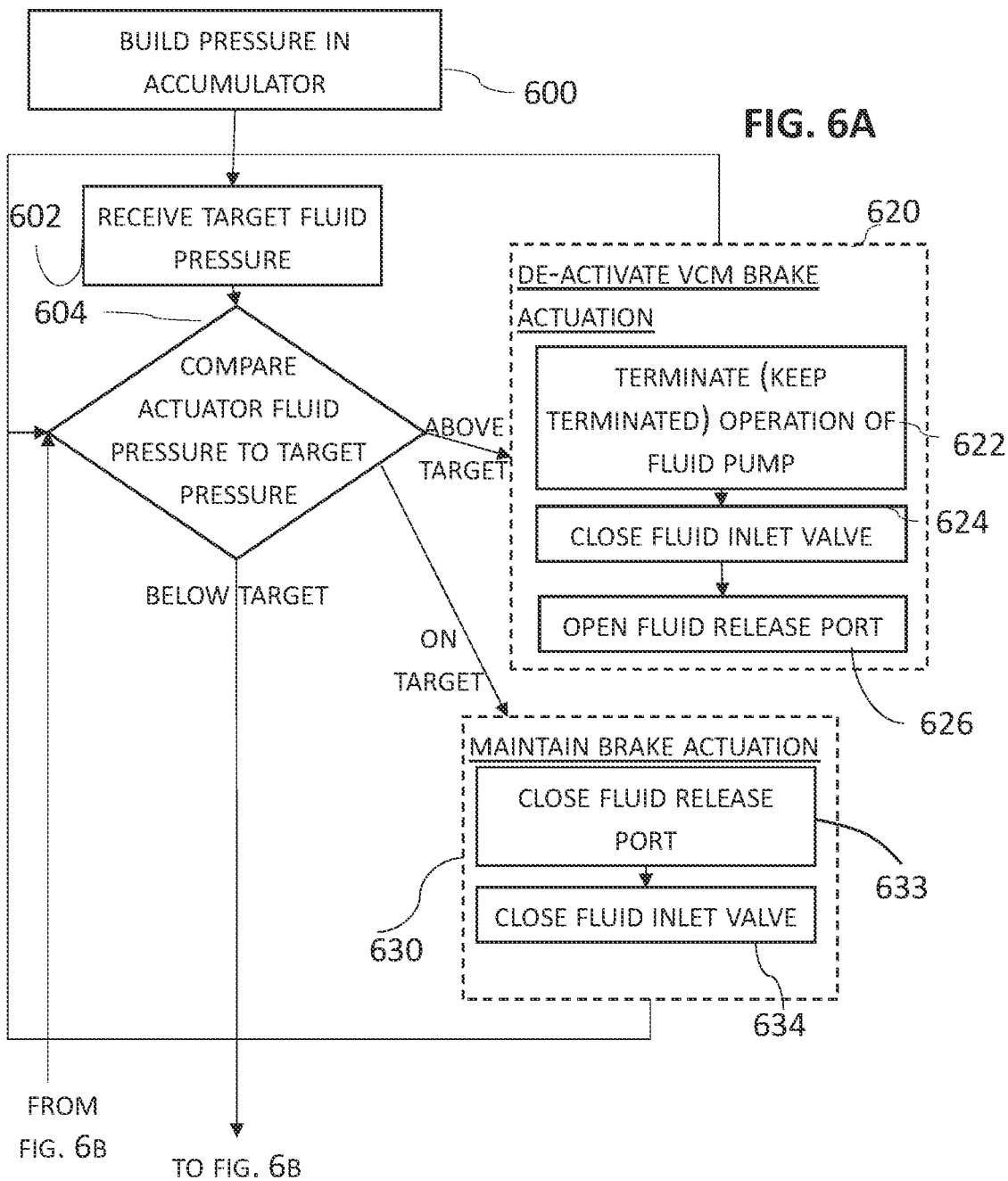

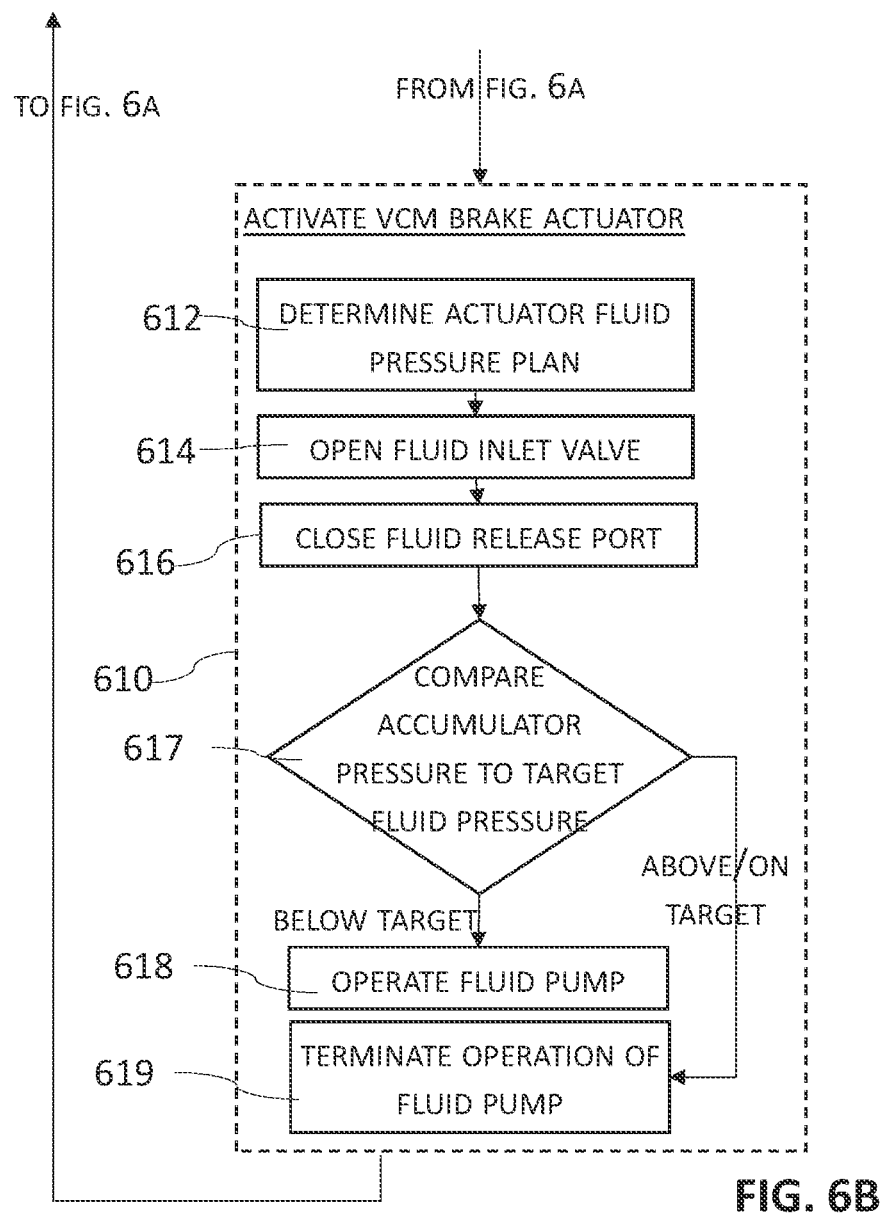

BRAKE SYSTEMS INTEGRATED INTO VEHICLE CORNER MODULES AND METHODS OF USE THEREOF

CROSS-REFERENCE TO RELATED APPLICATIONS

This patent application is a continuation of PCT/IB2021/055635 filed on Jun. 24, 2021, which is incorporated herein by reference in its entirety. PCT/IB2021/055635 claims the benefit of U.S. Provisional Patent Application No. 63/043,150 filed on Jun. 24, 2020, which is incorporated herein by reference in its entirety.

FIELD OF THE INVENTION

The present invention relates to vehicle brake systems and particularly to vehicle brake systems integrated in Vehicle Corner Modules (VCMs), and to methods of operating and servicing such brake systems.

BACKGROUND OF THE INVENTION

In recent years, autonomous and electric cars have been developed. One of the technologies that assists in the development of autonomous and electric cars is that of the vehicle-corner-module (VCM), to which the wheels are typically mounted, and as such VCMs are also known as wheel-corner-modules.

Some modern vehicles include driver assisting systems, which are typically associated with the brake system. Stability control systems (also known as Electronic Stability Programs (ESP) or Electronic Stability Control (ESC) systems), may also include one or more other driver assisting assemblies, such as ABS (Anti-lock brake), TCS (Traction control system), HAC (hill-start assist control), and the like. ESC systems typically include a hydraulic 4-channel ESC modulator, having 12 valves. The ESC modulator regulates fluid flow to/from all the brake actuators of the vehicle, for example via pressure inlet/outlet valves, to operate the brake actuators. It is common that the ESC modulator regulates the operation of brake actuators for vehicle speed reduction (e.g. by master cylinder, adaptive cruise control, auto emergency braking (AEB)), as well as for braking actions resulting from a computerized brake instruction (e.g. for stability control). Typically, vehicles have a centralized ESC system, wherein components of the system, including an ESC control circuit, the ESC modulator, and a fluid pump, are all located on the vehicle platform.

There is a need in the art for braking systems suitable for VCMs in which servicing and installation of the brake system are simple and safe.

SUMMARY

According to an aspect of some embodiments of the present invention there is provided a Vehicle Corner Module (VCM) based brake system adapted to be between a wheel assembled to a VCM connectable to a vehicle platform, and the vehicle platform. The VCM-based brake system includes a brake actuator, adapted to regulate the rotation rate of the wheel assembled to the VCM. The VCM-based brake system further includes a fluid-based brake power source, fluidly connected to the brake actuator and adapted to provide pressurized brake fluid for operating the brake actuator. The VCM-based brake system also includes a brake-control-circuit, functionally associated with the brake actuator and with the brake power source, and adapted to provide functional inputs to the brake actuator based on a target rotation rate profile desired for the wheel. In some embodiments, all mechanical components of the VCM-based brake system are disposed within the VCM, and the VCM-based brake system and the vehicle platform are not in fluid communication with each other.

In some embodiments, the VCM-based system is airtight and fluid tight within the VCM. In some embodiments, the VCM-based system is mechanically decoupled from the vehicle platform.

In some embodiments, the fluid-based brake power source is a hydraulic brake power source.

According to another aspect of some embodiments of the present invention there is provided a Vehicle Corner Module (VCM) based brake system adapted to be between a wheel assembled to a VCM connectable to a vehicle platform, and the vehicle platform. The VCM-based brake system includes a brake actuator, adapted to regulate the rotation rate of the wheel assembled to the VCM. The VCM-based brake system further includes a fluid-based brake power source, fluidly connected to the brake actuator and adapted to provide pressurized brake fluid for operating the brake actuator. The VCM-based brake system also includes a brake-control-circuit, functionally associated with the brake actuator and with the brake power source, and adapted to provide functional inputs to the brake actuator based on a target rotation rate profile desired for the wheel. In some embodiments, all mechanical components of the VCM-based brake system are disposed within the VCM and the VCM-based brake system is air-tight, and fluid-tight, within the VCM.

In some embodiments, the fluid-based brake power source is a hydraulic brake power source. In some embodiments, the VCM-based system is mechanically decoupled from the vehicle platform.

According to a further aspect of some embodiments of the present invention there is provided a Vehicle Corner Module (VCM) based brake system adapted to be between a wheel assembled to a VCM connectable to a vehicle platform, and the vehicle platform. The VCM-based brake system includes a brake actuator, adapted to regulate the rotation rate of the wheel assembled to the VCM. The VCM-based brake system further includes a fluid-based brake power source, fluidly connected to the brake actuator and adapted to provide pressurized brake fluid for operating the brake actuator. The VCM-based brake system also includes a brake-control-circuit, functionally associated with the brake actuator and with the brake power source, and adapted to provide functional inputs to the brake actuator based on a target rotation rate profile desired for the wheel. In some embodiments, all mechanical components of the VCM-based brake system are disposed within the VCM, and the VCM-based brake system is mechanically decoupled from the vehicle platform.

In some embodiments, the fluid-based brake power source is a hydraulic brake power source.

According to yet another aspect of some embodiments of the present invention there is provided a Vehicle Corner Module (VCM) based brake system adapted to be between a wheel assembled to a VCM connectable to a vehicle platform, and the vehicle platform. The VCM-based brake system includes a brake actuator, adapted to regulate the rotation rate of the wheel assembled to the VCM. The VCM-based brake system further includes a brake power source, fluidly connected to the brake actuator and adapted to provide power for operating the brake actuator. The VCM-based brake system also includes a brake-control-circuit, functionally associated with the brake actuator and with the brake power source, and adapted to provide functional inputs to the brake actuator based on a target rotation rate profile desired for the wheel. The brake actuator, the brake power source, and the brake-control-circuit are disposed within the VCM.

In some embodiments, the brake power source is a fluid-based brake power source fluidly connected to the brake actuator and adapted to provide brake fluid for operating the brake actuator.

In some embodiments, the VCM-based brake system further includes a brake-interface-circuit, adapted to facilitate communication between the brake-control-circuit and at least one computing unit external to the VCM. In some embodiments, the brake-interface-circuit is adapted to facilitate communication between the brake-control-circuit and a vehicle-control-circuit mounted onto the vehicle platform. In some other embodiments, the brake-interface-circuit is adapted to facilitate communication between the brake-control-circuit and another control-circuit, external to the VCM.

In some embodiments, the VCM-based brake system further includes a speed-control-circuit including a storage circuit adapted to store the target rotation rate profile desired for the wheel, a feedback loop adapted to compare a measured rotation rate profile of the wheel to the target rotation rate profile, and a communication interface functionally associated with the brake-control-circuit, adapted to provide the target rotation rate profile to the brake-control-circuit.

In some such embodiments, the VCM-based brake system further includes a wheel rotation sensor functionally associated with the feedback loop, the wheel rotation sensor adapted to provide to the feedback loop inputs indicating the measured rotation rate of the wheel.

In some embodiments, the brake power source includes a brake fluid source storing the brake fluid and a fluid pump disposed downstream of the fluid source in fluid communication with the brake fluid source and with the brake actuator, the fluid pump adapted to regulate a fluid pressure of the brake fluid delivered from the brake fluid source to the brake actuator for actuation of the brake actuator.

In some embodiments, the VCM-based brake system further includes a brake modulator including at least one valve, wherein in at least one state of the valve, the valve is in fluid communication with the brake actuator, the brake modulator adapted to regulate flow of the brake fluid between the brake actuator, the brake fluid source, and the fluid pump. In some such embodiments, the at least one valve includes a fluid inlet valve having at least one operative orientation adapted to allow flow of pressurized brake fluid from the fluid pump to the brake actuator, and a fluid release valve having at least one operative orientation adapted to allow release of brake fluid from the brake actuator toward the brake fluid source. In some other embodiments, the at least one valve includes a single valve having at least a fluid inlet operative orientation and a fluid release operative orientation, wherein in the fluid inlet operative orientation the single valve is adapted to allow flow of pressurized brake fluid from the fluid pump to the brake actuator, and in the fluid release operative orientation the single valve is adapted to allow release of brake fluid from the brake actuator toward the brake fluid source.

In some embodiments, the brake modulator is adapted to receive control inputs from the brake-control-circuit of the VCM. In some embodiments, the brake modulator includes a brake actuator pressure sensor, adapted to sense a pressure applied by the brake actuator, and to provide readings of the sensed brake actuator pressure to the brake-control-circuit. In some embodiments, the brake modulator includes an actuator fluid pressure sensor, adapted to sense a pressure of fluid provided to the brake actuator, and to provide readings of the sensed fluid pressure to the brake-control-circuit.

In some embodiments, the brake modulator forms part of the brake-control-circuit. In some other embodiments, the brake modulator forms part of the brake actuator.

In some embodiments, the brake power source functions as a pressure modulator, functionally associated with the fluid pump and with the brake modulator, the pressure modulator having a pressurized fluid accumulator disposed downstream of the fluid pump, in fluid communication with the brake modulator, the fluid pump being adapted to provide pressurized brake fluid to the pressurized fluid accumulator for storage therein, and the pressurized fluid accumulator being adapted to provide pressurized fluid to the brake for actuation of the brake actuator.

In some embodiments, the pressure modulator is adapted to modulate pressure of brake fluid supplied to the brake actuator. In some embodiments, the fluid pump is adapted to provide pressurized brake fluid to the pressurized fluid accumulator independently of the brake-control-circuit providing the functional inputs to the brake actuator for actuation thereof. In some embodiments, the fluid pump is adapted to generate fluid at a target pressure, for accumulation within the pressurized fluid accumulator.

In some embodiments, the VCM-based brake system further includes a no-return valve disposed on a fluid line connecting the pressure modulator and the brake modulator, the no-return valve is adapted to allow fluid flow only from the pressurized fluid accumulator to the brake modulator, and not in the opposing direction.

In some embodiments, the brake control circuit is adapted to provide control inputs to the brake modulator and to the pressure modulator.

In some embodiments, the brake modulator includes a modulator pressure sensor, adapted to sense a pressure of fluid provided from the pressure modulator to the brake modulator, and to provide readings of the sensed fluid pressure to the brake-control-circuit.

In some embodiments, the VCM-based brake system further includes a brake regeneration module disposed within the VCM, the brake-control-circuit being adapted to regulate activation of at least one of the brake regeneration module and the brake actuator.

According to another aspect of some embodiments of the present invention there is provided a vehicle corner module (VCM) for regulating motion of a vehicle, including a sub-frame including a wheel hub, adapted for mounting of a wheel thereon, and a vehicle-connection interface for connection of the sub-frame to a vehicle platform, a VCM-based brake system according to any one of the embodiments herein, mounted onto the sub-frame between the wheel hub and the connection interface, and a motor adapted to rotate the wheel, where the brake-control-circuit is configured to control a rotation rate of the wheel.

In some embodiments, a specific VCM is functionally mountable onto the vehicle platforms of at least two different vehicles, the at least two different vehicles being of two different types or of two different models.

According to a further aspect of some embodiments of the present invention there is provided a vehicle, including a vehicle platform, having at least one Vehicle Corner Module (VCM)-connection interface for mechanical connection to a VCM, and at least one VCM as described herein, the vehicle-connection interface of the at least one VCM connected to the at least one VCM-connection interface.

In some embodiments, the VCM-based brake system is a fluid operated VCM-based brake system, and there is no fluid communication between the VCM-based brake system and the vehicle platform.

In some embodiments, the vehicle platform includes a first VCM-connection interface and a second VCM-connection interface and the at least one VCM includes a first VCM including a first VCM-based brake system and a first vehicle-connection interface connected to the first VCM-connection interface of the vehicle platform, and a second VCM including a second VCM-based brake system and a second vehicle-connection interface connected to the second VCM-connection interface of the vehicle platform. The first VCM-based brake system is of a first type, and the second VCM-based brake system is of a second type, the second type being different from the first type. In some embodiments, the first VCM connection interface is at a front portion of the vehicle platform, and the second VCM connection interface is at the rear portion of the vehicle platform. In some other embodiments, the first VCM connection interface is on the right side of the vehicle platform, and the second VCM connection interface is on the left side of the vehicle platform.

In some embodiments, the at least one VCM includes two VCMs, each of the two VCMs including a communication interface, adapted for intercommunication between the two VCMs. In some embodiments, the intercommunication between the two VCMs includes wireless communication. In some embodiments, the intercommunication between the two VCMs includes wired communication via a communication channel mounted onto the vehicle platform. In some embodiments, the intercommunication between the two VCMs takes place via a computing device remote from the vehicle platform.

According to a further aspect of some embodiments of the present invention there is provided a method of operating the VCM-based brake system of aspects of the disclosed technology, the method including:

at the brake-control-circuit, obtaining a measured wheel rotation rate of the wheel;

at the brake-control-circuit, obtaining a target wheel rotation rate for the wheel;

comparing the measured wheel rotation rate to the target wheel rotation rate;

in response to identifying that the actual wheel rotation rate is higher than the target wheel rotation rate, activating the brake actuator; and in response to identifying that the actual wheel rotation rate is lower than the target wheel rotation rate, deactivating the brake actuator.

According to another aspect of some embodiments of the present invention there is provided a method of servicing the VCM-based brake system of a vehicle including at least one VCM according to aspects of the disclosed technology attached to a vehicle platform, the method including detaching the VCM from the vehicle platform, and while the VCM is detached from the vehicle platform, servicing the VCM-based brake system accommodated within the VCM.

In some embodiments, the method further includes, during the servicing of the VCM-based brake system attaching a replacement VCM including a replacement VCM-based brake system to the vehicle platform, and operating the vehicle using the replacement VCM-based brake system.

In some embodiments, the servicing of the VCM-based brake system occurs at a location remote from the vehicle platform.

According to another aspect of some embodiments of the present invention there is provided a method of operating a Vehicle Corner Module (VCM)-based brake system including at least one control circuit, the VCM-based brake system being disposed within a VCM, the method including:

at the control circuit, obtaining a measured wheel rotation rate of a wheel mounted onto the VCM;

at the control circuit, obtaining a target wheel rotation rate for the wheel;

comparing the measured wheel rotation rate to the target wheel rotation rate;

in response to identifying that the actual wheel rotation rate is higher than the target wheel rotation rate, activating a brake actuator of the VCM-based brake system; and in response to identifying that the actual wheel rotation rate is lower than the target wheel rotation rate, deactivating the brake actuator of the VCM-based brake system.

In some embodiments, the VCM-based brake system is functionally associated with a brake regeneration module, the method further including operating the brake regeneration module in conjunction with the brake actuator to regulate the measured rotation rate of the wheel.

In some embodiments, the VCM-based brake system is a fluid operated VCM-based brake system including a fluid pump disposed within the VCM and adapted to pump pressurized brake fluid toward the brake actuator, at least one fluid line adapted to provide fluid communication between the fluid pump and the brake actuator, and at least one valve disposed along the fluid line. In such embodiments, activating the brake actuator includes activating the fluid pump to pump pressurized brake fluid toward the brake actuator, via the fluid line, and setting the at least one valve to a position in which the fluid pump and the brake actuator are in fluid communication, allowing pressure build-up at the brake actuator.

In some embodiments, the method further includes measuring a fluid pressure within the brake actuator and based on the measured fluid pressure, operating the fluid pump to regulate the fluid pressure within the brake actuator.

In some embodiments, the VCM-based brake system further includes a pressurized fluid accumulator in fluid communication with the fluid pump and with the brake actuator, and the activating of the fluid pump includes activating the fluid pump to provide pressurized fluid to the pressurized fluid accumulator and allowing pressurized fluid to flow from the pressurized fluid accumulator toward the brake actuator.

In some embodiments, activating of the fluid pump to provide pressurized fluid occurs independently of the activating of the brake actuator.

According to another aspect of some embodiments of the present invention there is provided a method of operating a Vehicle Corner Module (VCM)-based brake system including at least one control circuit, the VCM-based brake system including a brake modulator and a pressure modulator, the VCM-based brake system being disposed within a VCM, the method including:

pressurizing brake fluid and storing the pressurized brake fluid in an accumulator of the pressure modulator;

at the control circuit, obtaining a measured brake fluid pressure in a fluid line between the pressure modulator and a brake actuator of the VCM-based brake system;

at the control circuit, obtaining a target fluid pressure required in the fluid line;

comparing the measured brake fluid pressure to the target fluid pressure;

in response to identifying that the measured brake fluid pressure rate is higher than the target fluid pressure, deactivating the brake actuator; and in response to identifying that the measured brake fluid pressure rate is higher than the target fluid pressure, activating the brake actuator.

According to yet another aspect of some embodiments of the present invention there is provided a method of servicing a VCM-based brake system disposed within a VCM mounted onto a vehicle platform of a vehicle, the VCM-based brake system being mechanically decoupled from the vehicle platform, the method including:

detaching the VCM from the vehicle platform;

while the VCM is detached from the vehicle platform, servicing the VCM-based brake system accommodated within the VCM.

In some embodiments, the method further includes, during the servicing of the VCM-based brake system, attaching a replacement VCM including a replacement VCM-based brake system to the vehicle platform and operating the vehicle using the replacement VCM-based brake system.

In some embodiments, the servicing of the VCM-based brake system occurs at a location remote from the vehicle platform. In some embodiments, the VCM-based brake system is a hydraulic VCM-based brake system, which is airtight and fluid-tight within the VCM. In some embodiments, there is no fluid communication between the hydraulic VCM-based brake system and the vehicle platform when the VCM is connected to the vehicle platform.

Unless otherwise defined, all technical and/or scientific terms used herein have the same meaning as commonly understood by one of ordinary skill in the art to which the invention pertains. In the case of conflict, the specification, including any definitions therein, will take precedence.

As will be appreciated by one skilled in the art, some embodiments of the present invention may be embodied as a system, method or computer program product. Accordingly, some embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, some embodiments of the present invention may take the form of a computer program product embodied in one or more computer readable medium(s) having computer readable program code embodied thereon. Implementation of the method and/or system of some embodiments of the invention can involve performing and/or completing selected tasks manually, automatically, or using a combination thereof. Moreover, according to the actual instrumentation of embodiments of the disclosed technology, selected tasks may be implemented by hardware components, software components, firmware components, or by a combination thereof, e.g., using an operating system.

For example, hardware for performing selected tasks of embodiments of the disclosed technology may be implemented as a chip or a circuit. Selected tasks of embodiments of the disclosed technology may be implemented as a plurality of software instructions stored in a computer readable storage medium and executed by a processor using any suitable operating system. One or more tasks according to embodiments of the disclosed technology may be performed by a processor, such as a computing platform, executing instructions. Optionally, the processor may be associated with a volatile or non-volatile memory for storing instructions and/or data, for example, a magnetic hard-disk and/or removable media. In some embodiments, a computing device, processor, circuit, or controller may be associated with a network connection, or a network interface. In some embodiments, a computing device, processor, circuit, or controller may be associated with an output interface such as a display and/or an input interface such as a keyboard or mouse.

Any combination of one or more computer readable medium(s) may be utilized for some embodiments of the disclosed technology. The computer readable medium may be a computer readable signal medium or a computer readable storage medium.

A computer readable storage medium may be, for example, an electronic, magnetic, optical, electromagnetic, infrared, or semiconductor system, apparatus, or device, or any suitable combination thereof. More specific examples of computer readable storage media include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of the disclosed technology, a computer readable storage medium may be any tangible medium that can contain or store a program for use by, or in connection with, an instruction execution system, apparatus, or device, such as a processor.

A computer readable signal medium may include a propagated data signal with computer readable program code embodied therein, for example, in baseband or as part of a carrier wave. Such a propagated signal may take any of a variety of forms, including an electromagnetic signal, an optical, or a combination thereof. A computer readable signal medium may be any computer readable medium that is not a computer readable storage medium and that can communicate, propagate, or transport a program for use by, or in connection with, an instruction execution system, apparatus, or device, such as a processor.

Program code embodied on a computer readable medium and/or data used thereby may be transmitted using any appropriate medium, including wireless, wireline, optical fiber cable, RF, transmission or communication, or any combination thereof.

Computer program code for carrying out operations of embodiments of the disclosed technology may be written in any combination of one or more programming languages. The program code may execute entirely locally, partly locally, as a stand-alone software package, partly locally and partly remotely, or entirely remotely, such as on a remote computer, server, or in the Cloud. The remote computing device may communicate may be connected with the local computing device via any suitable network, including a local area network (LAN) or a wide area network (WAN), or the connection may be via an external computer (for example, through the Internet using an Internet Service Provider).

Some embodiments of the disclosed technology may be described with reference to flowcharts and/or block diagrams. It will be understood that each block of a flowchart and/or block diagrams, or combinations of such blocks, may be implemented as computer program instructions, which, when executed, implement the functions or actions specified in the block(s) of the flowchart and/or block diagram. Some of the methods described herein are generally designed only for use by a computer and may not be feasible or practical for performing purely manually, by a human expert. A human expert who wanted to manually perform similar tasks, such as controlling brake operation, might be expected to use completely different methods, e.g., making use of expert knowledge and/or the pattern recognition capabilities of the human brain, which would be vastly more efficient than manually going through the steps of the methods described herein.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

As used herein, the term "computing device" relates to any device having a processing unit into which it is possible to load or install code that can be executed by the processing unit. The loading or installation of the code may be possible even while the device is operative in the field, or may be possible only in the factory.

As used herein, the terms "network" and "computing network" relate to a collection of computing devices and peripheral devices which are all connected to common communication means that allow direct communication between any two of the devices without requiring passing the communicated data through a third device. The network includes both the connected devices and the communication means. A network may be wired or wireless or partially wired and partially wireless.

As used herein, the term "or" is a logical operator combining two Boolean input conditions into a Boolean compound condition, such that the compound condition is satisfied if and only if at least one of the two input conditions is satisfied. In other words, if condition C=condition A or condition B, then condition C is not satisfied when both condition A and condition B are not satisfied, but is satisfied in each of the following cases: (i) condition A is satisfied and condition B is not satisfied, (ii) condition A is not satisfied and condition B is satisfied, and (iii) both condition A and condition B are satisfied.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. In the drawings:

FIGS. 6A and 6B together are a flowchart of a method of operating a hydraulic VCM-based brake system including, or associated with, a VCM-pressure-modulator, according to some embodiments of the disclosed technology;

DETAILED DESCRIPTION OF SOME EMBODIMENTS OF THE INVENTION

Figure 1A:
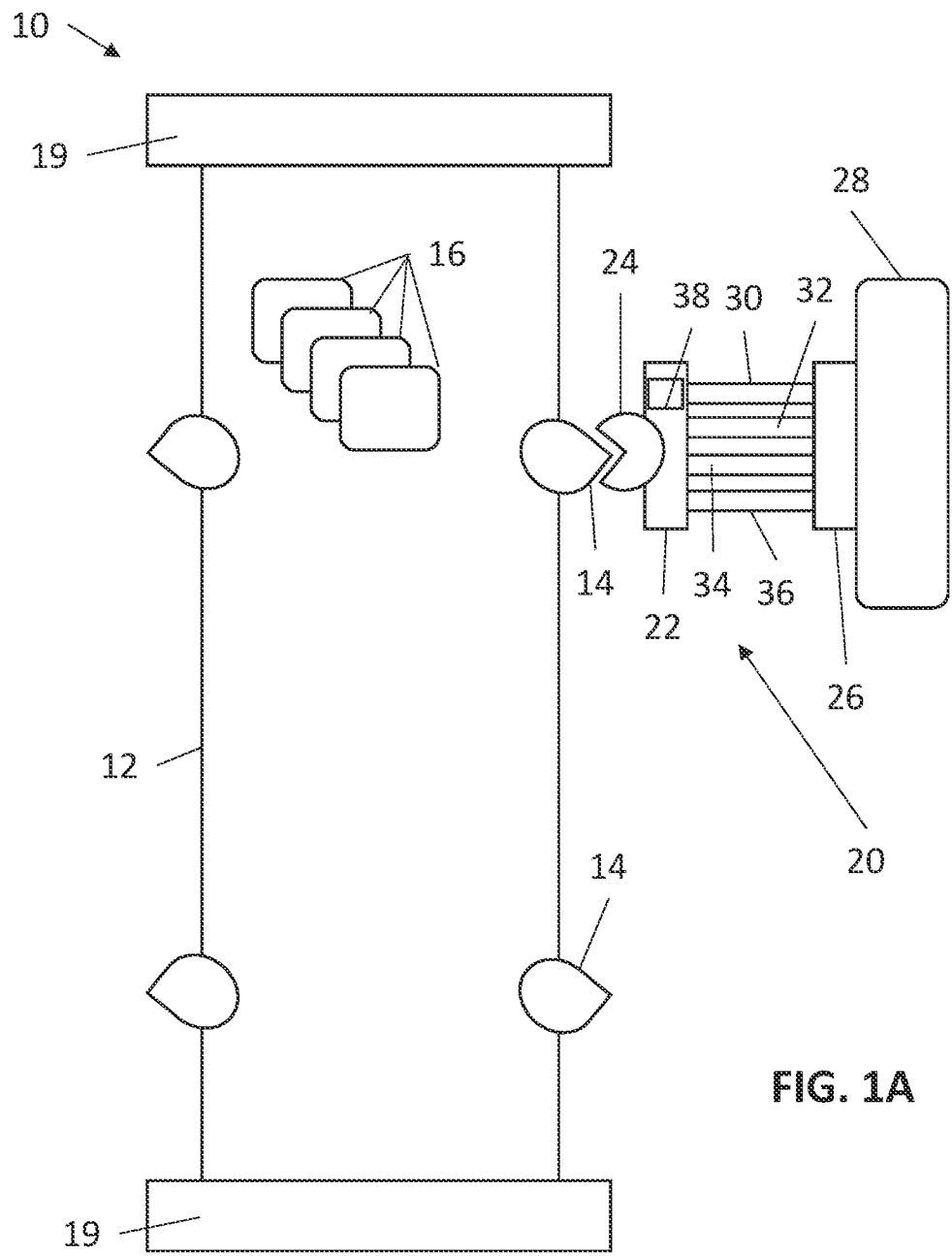
FIG. 1A is a schematic block diagram of a VCM and a vehicle platform adapted to have the VCM mounted thereon, according to an embodiment of the disclosed technology.

The present invention, in some embodiments, relates to vehicle brake systems and particularly to vehicle brake systems integrated in Vehicle Corner Modules (VCMs), and to methods of operating and servicing such brake systems.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Overview

Vehicle brake systems typically have components distributed between a wheel assembly and the vehicle platform. Brake actuation requires transferring of power from the vehicle platform to the wheel assembly. For example, hydraulic brake actuation requires transfer of hydraulic fluid pressure, via fluid lines, from a fluid reservoir mounted onto the vehicle platform, to the wheel assembly. In some cases, the brake system has two brake circuits, to provide redundancy for safety purposes.

Distributed braking systems having some components disposed on the vehicle platform, and other components disposed close to the wheel, are disadvantageous for several reasons. First, long connection lines are required to connect the components on the vehicle platform to the components on the wheel assemblies. Additionally, particularly in hydraulic systems, replacement of brake system components requires detachment of the hydraulic connection line, which can lead to hazardous introduction of air into the hydraulic lines, and damage to the brake system.

As used herein, the term/phrase vehicle platform means a platform of the vehicle, such as the chassis or a reference frame to which other components of the vehicle are attached (e.g. suspension system, vehicle body, electrical control unit, and power source). Servicing the brake system requires access to the vehicle platform as well as to the wheel, or vehicle corner, assemblies. This may complicate servicing and extend the downtime of the serviced vehicle.

In accordance with some embodiments of the disclosed technology, a VCM-based brake system is confined within the VCM, possibly receiving electronic input from a controller mounted on the vehicle platform. It is a feature of such embodiments that servicing of such a brake system may be carried out away from the vehicle platform, for example after another VCM has been placed on the vehicle, maintaining the operational ability of the vehicle during servicing of the brake system. This significantly simplifies servicing of the vehicle, and reduces downtime of the vehicle for servicing and maintenance thereof.

It is another feature of the disclosed technology that safety is enhanced, by increasing redundancy of the brake system to 4 independent brake circuits. In accordance with some embodiments, the four independent brake circuits may include at least two different types of brake circuits, having at least one different characteristic therebetween.

It is a further feature of the disclosed technology that the VCM-based brake system is independent of the car model of type, such that a VCM may be functionally suitable for use with multiple car models or types.

According to an embodiment of the disclosed technology, there is provided a VMC-based brake system, adapted to be assembled within a VCM, between the vehicle platform (e.g. chassis, wheel well) and a wheel assembled to the VCM. The VCM-based brake system includes a brake-control-circuit (e.g. one or more brake controller) adapted to receive data about a rotation rate of the wheel assembled to the VCM. The data may be measured by a rotation rate sensor, functionally associated with, or integrated within, the VCM. In some embodiments, the brake-control-circuit is functionally associated with a speed control circuit (SCC), which outputs a target wheel rotation rate.

In some embodiments, the VCM-based brake system includes a brake actuator (e.g. a brake caliper) that regulates the rotation rate of the wheel. The brake actuator is functionally associated with the brake-control-circuit, and receives actuation inputs from the brake-control-circuit. In some embodiments, the brake actuator may be directly or indirectly connected to the brake-control-circuit.

In some embodiments, the VCM-based brake system includes one or more brake power sources, which may be disposed within the VCM, and which provide operational power to the brake actuator and/or to the brake-control-circuit. In some embodiments, the brake power source includes a fluid pump, a fluid source, an electrical power source (e.g. a battery), or a combination thereof. In some embodiments, the brake-control-circuit is adapted to receive brake fluid pressure values, measured at or adjacent components of the VCM-based brake system, disposed on the VCM.

According to some embodiments, the VCM-based brake system includes one or more brake-interface-circuits adapted to allow an interface between the brake-control-circuit and one or more control circuits external to the VCM, such as control circuits mounted onto the vehicle platform or cloud based control circuits. In some embodiments, the brake-interface-circuit is integrated within a VCM connector, interfacing between the VCM and the vehicle platform.

According to an aspect of the current invention, there is provided a VCM-based brake system, comprising a brake controller assembled within a VCM of a vehicle. The brake controller includes one or more valves in fluid communication with a brake actuator to regulate delivery, maintenance, and release of fluid between the brake actuator, a fluid source, and a fluid pump.

According to some embodiments, the VCM-based brake system includes a fluid source in fluid communication with the brake controller. In some embodiments, the fluid source includes a local reservoir, disposed within the VCM, that substitutes a master cylinder traditionally located on the vehicle platform. In some embodiments, the VCM-based brake system includes a hydraulic fluid pump, which acts as a power source for actuating the brake actuator. In some embodiments, the fluid pump is in fluid communication with the brake controller and the fluid source.

It is a particular feature of the disclosed technology that when the hydraulic lines are disposed within the VCM, mounting of the VCM to the vehicle platform connects the VCM-based brake system to the vehicle platform, in an operational state. Additionally, connection and disconnection of the VCM from the vehicle platform can be carried out without disconnecting fluid lines or exposing fluid line to air contamination. The short distance between components of the VCM-based brake may increase system efficiency and performance of fluid based brake systems, such as hydraulic and/or pneumatic systems.

It is a particular feature of the disclosed technology that, because of the decoupling between the vehicle platform and the VCM-based brake system, servicing and testing of the VCM-based brake system may be carried out away from the vehicle platform. For example, diagnosing and/or calibrating of the VCM-based brake system may be done on a rig without having the vehicle platform available.

An aspect of the invention is related to an ESC modulator integrated within a VCM.

According to some embodiments, the ESC module of a vehicle includes an ESC control circuit adapted to control the ESC modulator. In some embodiments, the ESC control circuit is assembled on the vehicle platform. In some embodiments, the ESC control circuit is assembled within one or more of the VCMs of the vehicle.

According to some embodiments, in which the VCM-based brake system is a fluid operated brake system, fluid pressure for actuating the brake actuator is regulated by a single fluid pump disposed within the VCM, at least for brake actions initiated for the purpose of reducing the vehicle speed and/or for regulating the rotation rate of a wheel hub initiated by a computing unit (e.g. ESC).

An aspect of the current invention is related to providing ESC functionality by intercommunication between VCMs, without requiring data from a computing unit disposed on the vehicle platform. In some embodiments, the vehicle platform is devoid of an ESC controlling unit. In some embodiments, communication between VCMs is complemented by communication with an external computer, for example in fully or partially autonomous vehicles.

According to some embodiments, ESC modules disposed one the VCM intercommunicate. In some embodiments, the ESC modules are controlled solely by the ESCs within the VCMs, and do not receive control signals from a controller located on the vehicle platform. Inter communication between mounted VCMs may be between any two or more VCMs, including a pair of front or rear VCMs, between VMCs located on the same side of the vehicle, or between all the VCMs.

Reference is now made to FIG. 1A, which is a schematic block diagram of a VCM and a vehicle platform adapted to have the VCM mounted thereon, according to an embodiment of the disclosed technology.

As seen in FIG. 1A, a vehicle platform 10, which is adapted to have a vehicle capsule mounted thereon, includes a vehicle reference-frame 12, having VCM-connection interfaces 14 adapted for connection to VCMs.

Vehicle platform 10 may include one or more electronic subsystems 16 mounted onto reference frame 12, which may include a power supply of the vehicle, a control circuit of the vehicle, a computerized controller of the vehicle, a network bus of the vehicle, and a network interface of the vehicle. In some embodiments, reference-frame 12 may also have attached thereto front and/or rear bumpers 19.

A VCM 20, for regulating motion of the vehicle, is connectable to reference frame 12. According to some embodiments, VCM 20 includes a sub-frame 22, including a vehicle-connection interface 24 adapted for reversible mechanical connection to VCM-connection interface 14 of reference frame 12. VCM 20 further includes a wheel-hub assembly 26, adapted to have a wheel 28 mounted thereon. Sub-frame 22 has mounted thereon one or more subsystems of the vehicle, each comprising mechanical and/or electrical components. The subsystems may also be attached to wheel-hub assembly 26.

The subsystems included in the VCM may include a drive system 30, a steering system 32, a suspension system 34, and/or a brake system 36. Sub-frame 22 may also include a VCM-controller 38, adapted to control operation of one or more of systems 30, 32, 34, and 36, and/or to communicate with one or more electronic subsystems 16 of the vehicle, such as with a computerized controller or a network interface of the vehicle.

Drive system 30 may include any or all of the mechanical and/or electrical components required for actuating a drive shaft to rotate wheel 28, or other wheels of the vehicle, to drive the vehicle, including, and not exhaustively: an electric drive motor, a driveshaft turned by the motor, and gearing assemblies to transmit the rotation to the wheel including, optionally, a single-hear or multi-gear transmission, as well as sensors such as a wheel speed sensor (in a non-limiting example, a rotary encoder). In some embodiments, the drive motor is included in the VCM, and in some embodiments, the drive motor is on the vehicle, e.g., installed on reference frame 12. In some embodiments, the drive motor is mounted on sub-frame 22 and thereby is a sprung mass.

In embodiments, VCM-controller 38 is adapted to regulate an output of the motor and/or a rotational velocity of wheel 28 and/or a selection of a transmission gear, in response to instructions received via electrical inputs from the vehicle, e.g., from a driver-operated drive mechanism (e.g. an accelerator pedal) or an autonomous driving unit. In embodiments, the instructions include, for example, a current and a voltage for actuating the electric drive motor.

In embodiments, drive system 30 can be used in a regenerative braking scheme, as explained in further detail hereinbelow.

Steering system 32 may include any or all of the mechanical and/or electrical components required for steering, i.e., pivoting the wheel of the vehicle around a steering axis, including, and not exhaustively: a steering motor, a steering actuator, steering rods, steering system controller or control unit, steering inverter and wheel-angle sensor.

In some embodiments, VCM-controller 38 receives steering instructions as electrical (including electronic) inputs from the vehicle, e.g., from a driver-operated steering mechanism or an autonomous steering unit, and carries out the instructions by causing, responsively to the received instructions, the motion of a steering rod, e.g., via a steering actuator, to effect the turning of the wheel, for example, by regulating a current and voltage transmitted to the steering actuator and/or transmitting high-level instructions to a steering-system controller. The steering motor, actuator and/or inverter can receive electrical power from an external power source ('external' meaning external to the VCM), such as a power supply installed in or on the reference frame.

Suspension system 34 may optionally include an active suspension system controllable by the VCM-controller 38 (e.g., via a suspension-system control unit).

Brake systems 36 according to embodiments of the present invention is described hereinbelow with respect to FIGS. 1B to 4B.

In some embodiments, VCM controller 38 is configured to regulate an output of the braking system, e.g., cause a braking action, in response to instructions received via electrical inputs from the vehicle, e.g., from a driver-operated braking mechanism (e.g. a brake pedal) or an autonomous braking unit.

In some embodiments, the plurality of VCM subsystems in VCM 20 includes all of systems 30, 32, 34, and 36. In other embodiments, the plurality of VCM systems in a given VCM 20 may include two or three of the systems.

Figure 1B:
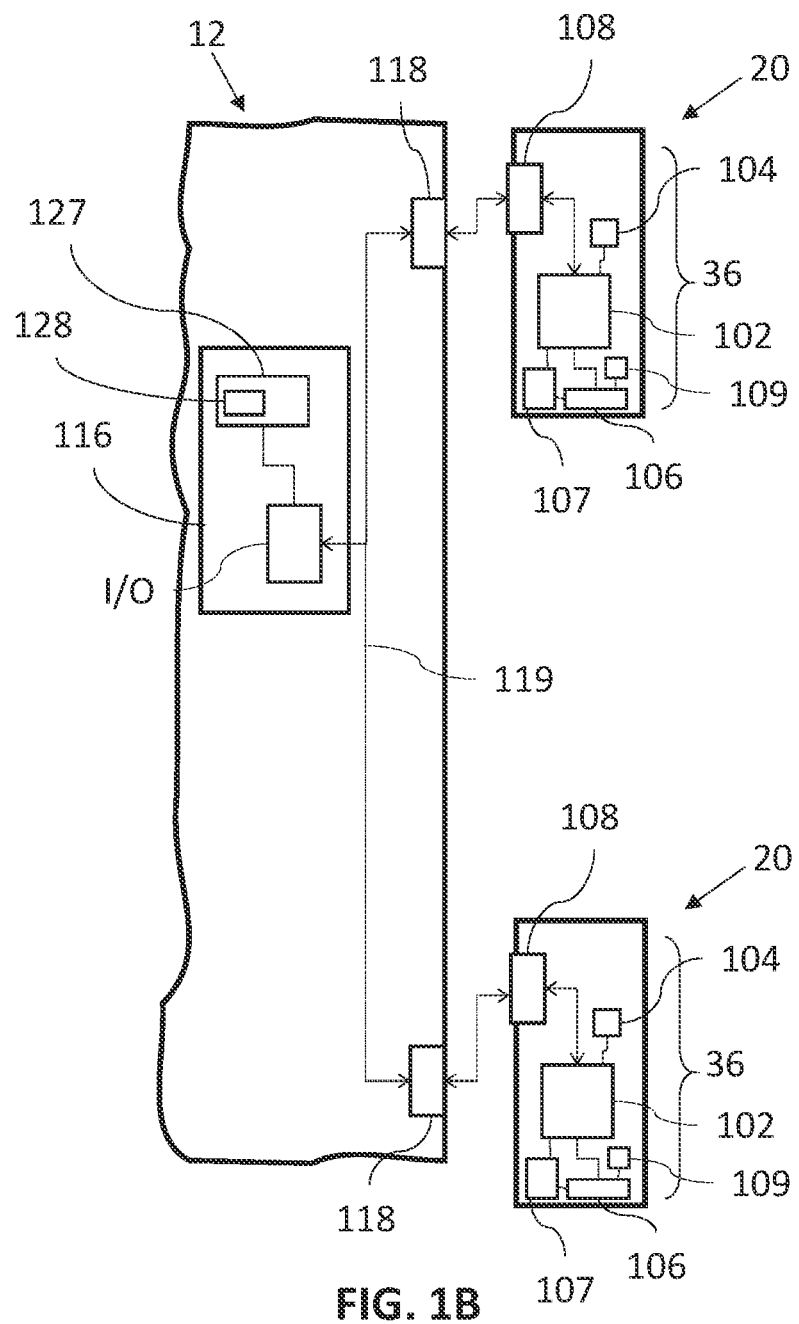
FIG. 1B is a schematic block diagram of a brake system within a VCM, according to some embodiments of the disclosed technology.

Reference is now made to FIG. 1B is a schematic block diagram of a brake system within a VCM, according to some embodiments of the disclosed technology.

As seen in FIG. 1B, VCM-based brake system 36, is adapted to be accommodated within VCM 20, between vehicle platform 12 and wheel 28 assembled to VCM 20.

VCM-based brake system 36 includes a brake-control-circuit (e.g. one or more brake controller) 102 adapted to receive data about a rotation rate of wheel 28. In some embodiments, the brake-control-circuit may form part of the VCM-controller 38. The rotation rate data may be measured by a rotation rate sensor 104, which may form part of VCM 20.

VCM-based brake system 36 includes a brake actuator (e.g. a brake caliper) 106, adapted to regulate the rotation rate of wheel 28, based on actuation inputs received from brake-control-circuit 102. In some embodiments, brake actuator 106 is connected directly to brake-control-circuit 102 to receive the actuation inputs therefrom. In other embodiments, brake actuator 106 is functionally associated with brake-control-circuit 102, for example by wireless communication.

VCM-based brake system 36 may further include one or more brake power sources 107, disposed within VCM 20. The brake power source(s) 107 is adapted to provide operational power to brake actuator 106 and/or to brake-control-circuit 102. In some embodiments, vehicle platform 12 may include a secondary or additional power source, not explicitly shown. In some embodiments, the brake power source may include a fluid pump, a fluid source (e.g. brake fluid reservoir, fluid cylinder), an electrical power source (e.g. a battery), or a combination thereof, as explained in further detail herein.

According to some embodiments, VCM-based brake system 36 includes one or more brake-interface-circuits 108 adapted to provide an interface between brake-control-circuit 102 and one or more vehicle control circuits mounted outside VCM 20. For example, brake-interface-circuit 108 may provide an interface with a vehicle controller 116 mounted onto vehicle platform 12. In some embodiments, brake-interface-circuit 108 form part of vehicle connection interface 24. In some embodiments, brake-interface-circuit 108 is adapted to connect to a platform connector 118, which may form part of VCM-connection interface 14 mounted onto vehicle platform 12. In some embodiments, brake-interface-circuit 108 includes one or more transmitters to establish wireless connection with circuits outside VCM 20, such as with a vehicle controller mounted onto the vehicle platform.

According to some embodiments, vehicle platform 12 includes a plurality of platform connectors 118. In some embodiments, two or more of platform connectors 118 are interconnected by a platform-VCM bus 119. In some embodiments, platform-VCM bus 119 is used for communication between computing circuits assembled within multiple VCMs 20.

According to some embodiments, brake-control-circuit 102 is functionally associated with a speed-control-circuit 127, which outputs a target rotation rate. In some embodiments, speed-control-circuit 127 forms part of vehicle controller 116, and is connected to vehicle platform 12. In some embodiments, a single speed-control-circuit 127 may provide inputs to, or control, brake system 36 of one or more VCMs 20. In some other embodiments, speed-control-circuit 127 may form part of VCM-based brake system 36, such that target rotation rate profile is determined by VCM 20. In some such embodiments, speed-control-circuit 127 is functionally associated with (e.g. via brake-interface-circuit 108) to a circuit disposed on vehicle platform 12, such as vehicle controller 116. The speed-control-circuit may be connected to controller 116, or may communicate therewith by wireless communication.

In some embodiments, speed-control-circuit 127 may include a storage unit 128 for storing a target rotation rate profile. In some embodiments, speed-control-circuit 127 may include a rotation rate feedback loop comparing a measured rotation rate profile of the wheel to the target rotation rate profile, as described in further detail hereinbelow. In some embodiments, speed-control-circuit 127 may include a transmitter for providing the target rotation rate profile to brake-control-circuit 102.

In some embodiments, at least a portion of speed-control-circuit 127 may be form part of another device (not explicitly shown) that controls the kinematic profile of wheel. For example, the device may control the profile of the wheel when VCM 20 is detached from the vehicle platform, e.g. on a servicing or testing rig. As another example, the device may control the profile of the wheel when the vehicle is controlled by a control unit which is remote from the vehicle.

In some embodiments, speed-control-circuit 127 includes some sub-circuits disposed within VCM-based brake system 36, and other sub-circuits disposed remotely to VCM-based brake system 36, such that the sub-circuits can communicate with one another via one or more suitable communication channel(s).

Brake actuator 106 may be friction based, e.g. a disk brake caliper or a drum brake. Brake actuator 106 may be non-friction based, such as an actuator using a magnetic field, fluid, and the like. In some embodiments, brake actuator 106 is electrically actuated, for example by receipt of an electrical input from brake-control-circuit 102 or from another control circuit. In some embodiments, brake actuator 106 is mechanically actuated, such as by fluid. For to example, brake actuator 106 may be hydraulic or pneumatic.

In some embodiments, VCM-based brake system 36 regulates the kinematic profile of wheel 28 by reducing, and/or maintaining the rotation rate of the wheel. In some embodiments, regulating the kinematic profile includes reducing, increasing, and/or maintaining a change in the rotation rate (e.g. accelerating, decelerating the rotation rate). In some embodiments, the kinematic profile may be regulated by brake-control-circuit 102. In some embodiments, the kinematic profile may be regulated by speed-control-circuit 127 and by brake-control-circuit 102. A method for regulating the kinematic profile of the wheel is described hereinbelow.

In some embodiments, rotation rate sensor 104 is a wheel-speed sensor, measuring one or more of a rotation speed, and acceleration/deceleration of rotation of wheel 28. As discussed hereinabove, rotation rate sensor 104 is disposed within VCM 20, for example by coupling thereof to wheel hub 26, to the drive shaft, or to the powertrain.

In some embodiments, VCM-based brake system 36 may include a brake pressure sensor 109 adapted to sense and/or measure a pressure applied by brake actuator 106 to regulate the rotation rate of wheel 28 (e.g. pressure applied by a brake disc or caliper). The measured pressure may be used by brake-control-circuit 102 and/or by speed-control-circuit 127 to determine whether additional brake actuation is required, as explained in further detail hereinbelow. In some embodiments, when the applied brake pressure is maximal, but the rate of rotation of wheel 28 is still too high, the rotation rate of the wheel may be further reduced using other methods, such as steering of one or more wheels, actuation of a brake regeneration system, activating a brake emergency system, and/or actuating a wheel motor, as explained hereinbelow.

In accordance with an embodiment of the disclosed technology, mounting of VCM 20 to vehicle platform 12, connects VCM-based brake system 36 to the vehicle platform, enabling the VCM-based brake system to immediately be operative. In some such embodiments, all components required to apply a braking force to wheel 28 are disposed within VCM 20. As such, no fluid connections are required in order to allow the brake system to be operative. In such embodiments, components of brake system 36 are all disposed at a short distance from each other, thereby increasing the efficiency and performance of the brake system, and improving access of an operator to the brake system components.

In accordance with some embodiments of the disclosed technology, servicing and testing of VCM-based brake system 36 may be carried-out when the VCM is distant from vehicle platform 12, for example following detachment of VCM 20 from the vehicle platform, as explained in further detail hereinbelow. This may further contribute to reducing downtime of vehicle 10 due to maintenance, since the vehicle operated using a replacement VCM during maintenance of VCM 20 and of VCM-based brake system 36.

In some embodiments of the disclosed technology, the cooling rate (thermal transfer) of brake controller 102 by air, is improved, relative to prior art systems in which the brake controller is disposed on the vehicle platform. This is because the brake controller 102 is exposed to air flow through VCM 20, where airflow may be faster than within vehicle platform 12.

In some embodiments, independent VCM-based braking systems 36 are installed in each of VCMs 20 mounted onto the vehicle platform 12. In such embodiments, vehicle braking safety is enhanced by increasing the redundancy to braking systems in the vehicle.

The independent nature of the VCM-based braking systems 36 allows for different types of braking systems 36 to be installed within different VCMs of the same vehicle. For example, the braking systems 36 installed in the front VCMs of the vehicle may have a different braking profile than the braking systems 36 installed in rear VCMs of the vehicle. As another example, the braking profile of a braking system within each VCM may be determined, at least in part, by other components or subsystems of the VCM. As such, a braking system 36 in a VCM including a steering system 32, may have a different braking profile than a similar braking system in a VCM which does not include the steering system.

The independent nature of the VCM-based braking systems 36, and their decoupling from the vehicle platform 12, also enables a VCM to be generic and suitable for use with different types or models of vehicles.

Hydraulic VCM-Based Brake System

Figure 2:
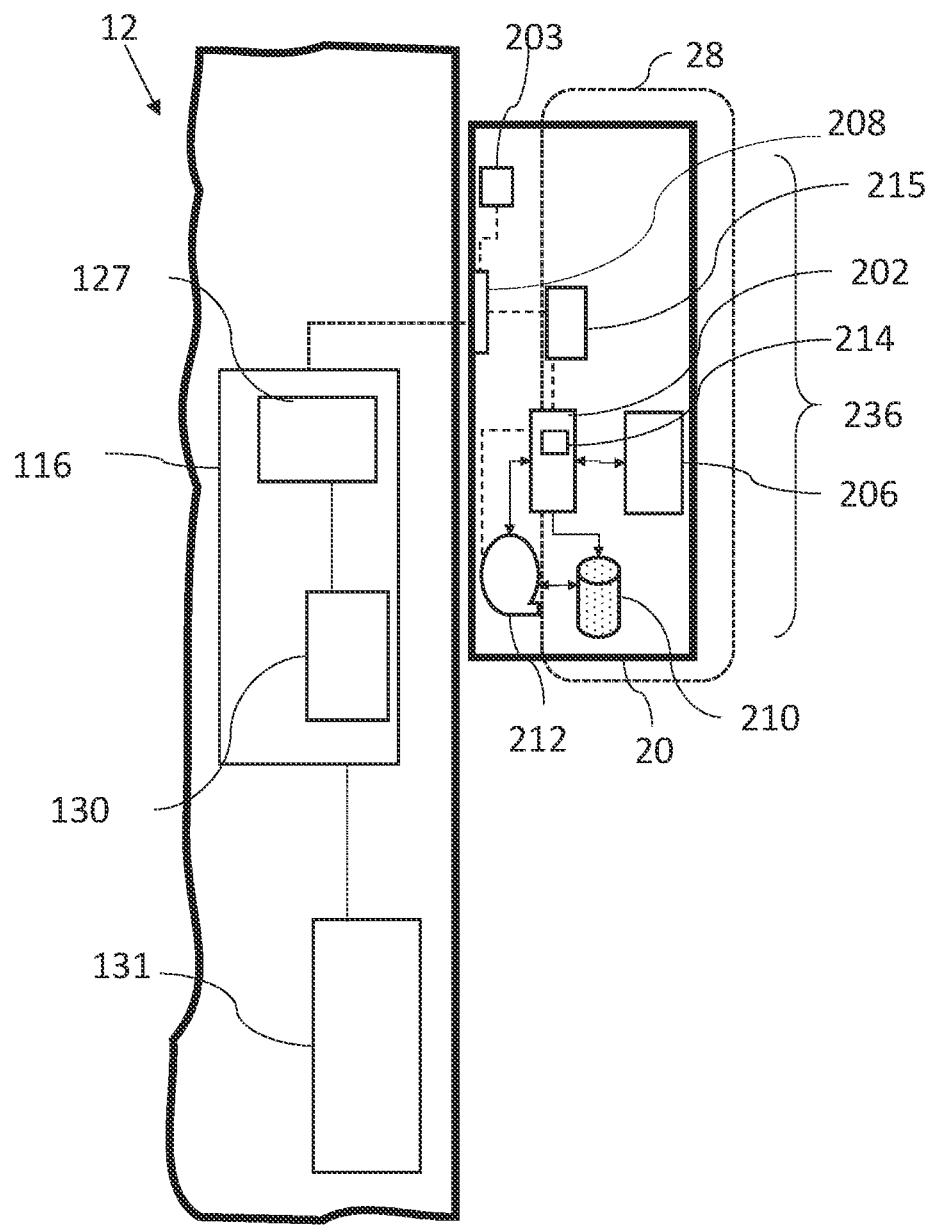
FIG. 2 is a schematic block diagram of a VCM-based brake system according to some embodiments of the disclosed technology.

Reference is now made to FIG. 2, which is a schematic block diagram of a hydraulic VCM-based brake system, according to some embodiments of the disclosed technology. It will be appreciated that though the description herein relates to a hydraulic VCM-based brake system, the disclosed technology is applicable also to pneumatic braking systems.

As is known in the art, hydraulic brake actuation requires the transfer of hydraulic fluid, via fluid lines, from a source reservoir. Typically, the source reservoir is mounted onto the vehicle platform, and the fluid lines extend from the platform to the brake system(s), adjacent the wheels. In vehicles, in which a hydraulic brake system has some components disposed within the corner assembly and other components mounted onto the vehicle platform (e.g. to the master cylinder, pump, and brake modulator), access and interaction with the vehicle platform as well as with the brake actuator at the wheel assembly is required for servicing of the vehicle and the brake system. Servicing of such a system typically requires disconnecting the brake system from the vehicle platform. Consequently, servicing of such distributed hydraulic brake systems is complicated, particularly when ensuring safe operation of the brake system, for example by ensuring that the hydraulic lines are devoid of air.

VCM-based brake systems according to the disclosed technology, as described hereinabove and as shown specifically in FIG. 2, overcome the deficiencies of the prior art systems, but ensuring that all components of the brake system are disposed within the VCM. As a result, the brake system is completely mechanically decoupled from the vehicle platform. Additionally, the hydraulic system is fluid tight and air tight within the VCM, regardless of connection or disconnection of the VCM to the vehicle platform.

As seen in FIG. 2, VCM 20 includes a hydraulic VCM-based brake system 236, adapted to be accommodated within VCM 20, between vehicle platform 12 and wheel 28.

Hydraulic VCM-based brake system 236 may be an embodiment of VCM-based brake system 36 of FIG. 1B, wherein brake actuator 206 is powered by hydraulic fluid. Brake-control-circuit 202, also termed herein a brake controller, includes one or more valves in fluid communication with brake actuator 206.

Hydraulic VCM-based brake system 236 includes a power source, equivalent to power source 107 of VCM-based brake system 36. However, the power source of hydraulic VCM-based brake system 236 includes two components, a hydraulic fluid source 210, and a hydraulic fluid pump 212. At least one of fluid source 210 and fluid pump 212 is disposed within VCM 20. However, in some embodiments, both fluid source 210 and fluid pump 212 are both disposed within the VCM.

In some embodiments, fluid source 210 is in fluid communication with brake controller 202. In some embodiments, fluid source 210 includes a local reservoir, within VCM 20. The local reservoir is adapted to replace a master cylinder or reservoir, which, in prior art systems, is located on vehicle platform 12.

In some embodiments, fluid pump 212 acts as a power source for actuating operation of brake actuator 206. Fluid pump 212 is in fluid communication with brake controller 202 and with fluid source 210, for example by hydraulic fluid lines, which may also be disposed within VCM 20. In some embodiments, pressurizing of fluid in the hydraulic system, for operation of brake actuator 206, occurs only within VCM 20. In such embodiments, the pressure is not applied from a component mounted onto vehicle platform 12. In some embodiments, fluid pump 212 includes a local reservoir, within VCM 20. The local reservoir is adapted to replace a main pump reservoir, which, in prior art systems, is located on vehicle platform 12.

In some embodiments, pump 212 functions as a pressure increasing pump, and is adapted to increase fluid pressure in a fluid line towards brake actuator 206). In some embodiments, pump 212 is bi-directional, and in addition to being adapted to increase pressure, it is further adapted to be operative decrease fluid pressure in the fluid line, for example to generate a negative pressure in brake actuator 206.

In some embodiments, ESC functionality is adapted to be integrated with, or form part of, brake-control-circuit 202. Consequently, one or more of ESC modulators and modulator-control-circuit(s) may be integrated within brake-control-circuit 202.

In some embodiments, VCM 20 includes a sub-frame, similar to sub-frame 22 of FIG. 1A, adapted to be attached to a reference frame of vehicle platform 12. In some embodiments, fluid source 210 is mounted onto the sub-frame. In some embodiments, fluid pump 212 is assembled to the sub-frame. In some such embodiments, fluid source 210 and/or fluid pump 212 function, on the sub-frame, as a sprung mass, reducing vibrations caused by loads applied to these components. Additionally, mounting of fluid source 210 and/or fluid pump 212 onto the sub-frame may increase air-flow around the fluid source and fluid pump, which may assist in chilling fluid source 210 and/or fluid pump 212 during operation thereof.

In some embodiments, brake controller 202 includes a brake pressure modulator 214, adapted to regulate delivery, maintenance, and release of fluid or fluid pressure between brake actuator 206, fluid source 210, and fluid pump 212.

In some embodiments, one or more components of hydraulic VCM-based brake system 236 may be electrically connected to each other or may communicate with each other, whether in a wired connection/communication or wirelessly. For example, fluid pump 212 may be connected to brake controller 202 by fluid and electrical connections.

In some embodiments, hydraulic VCM-based brake system 236 includes one or more brake-interface-circuits 208 adapted to allow an interface between brake-control-circuit 202 and one or more vehicle control circuits 116 mounted to vehicle platform 12. As discussed hereinabove, vehicle control circuit 116 may include a speed-control-circuit 127. In some embodiments, vehicle control circuit 116 may further include a VCM-systems-control-circuit 130, adapted to control systems of VCMs of the vehicle, and in some embodiments, also adapted to control interactions between the VCMs or the VCM systems. Typically, the vehicle control circuit 116, and specifically the VCM-systems-control-circuit 130, communicate with, and provide inputs to, control circuits mounted within the VCMs, such as the VCM controller 38 of FIG. 1A, or brake-control-circuit 202. Vehicle control circuit(s) 116 may be powered by a vehicle power source 131, mounted onto vehicle platform 12.

In some embodiments, as shown for example in FIG. 2A, brake-interface-circuit 208 forms part of a vehicle-connection interface, similar to vehicle-connection interface 24 of FIG. 1A. In some embodiments, brake-interface-circuit 208 includes one or more transmitters or transceivers, adapted to establish wireless connection with circuits external to VCM 20.

In some embodiments, VCM 20 includes a VCM controller 215, similar to VCM controller 38 of FIG. 1B. Inputs relating to a rotation profile of wheel 28 are received by VCM-controller 38, which is adapted to provide operational inputs to one or more of brake controller 202 and fluid pump 212.

As mentioned hereinabove, hydraulic VCM-based brake system 236 may be an embodiment of VCM-based brake system 36, and may include components and functionalities described with respect to FIG. 1B, such as a rotation rate sensor 203 similar to rotation rate sensor 104 and a brake pressure sensor similar to brake pressure sensor 107.

It is a particular feature that hydraulic VCM-based brake system according to the disclosed technology have shorter fluid transmission lines, or a reduced number of fluid transmission lines, relative to prior art systems in which the brake system is distributed between the vehicle platform and the VCM. The shortened/reduced fluid transmission lines allow for a reduced overall amount of hydraulic fluid within a closed brake system, and increased brake system efficiency and performance. Furthermore, the reduced volume of hydraulic fluid enables operation of the system using smaller, and weaker pumps.

Additionally, and as mentioned herein, according to the disclosed technology, the brake system is completely mechanically decoupled from the vehicle platform. Additionally, the hydraulic system is fluid tight and air tight within the VCM, regardless of connection or disconnection of the VCM to the vehicle platform. These aspects assist in maintenance of the to VCM and the vehicle in general, as discussed.

As discussed hereinabove, the VCM-based brake system of the disclosed technology allows for greater redundancy and increased safety of the braking system. This is particularly true for hydraulic systems. As is well known in the art, hydraulic brake systems often malfunction because of heated brake fluid or gas bubbles mixed in the fluids within the fluid transmission lines. In prior art hydraulic systems, in which the brake fluid and fluid lines are shared between multiple brake actuators or circuits, such deficiencies affect all the brake actuators sharing the fluid, or fluid lines, which may result in reducing the brake performance of the vehicle. The independence of VCM-based brake systems for the disclosed technology from one another, and specifically the independent fluid transmission components, ensure that if the quality of fluid is reduced in one of the reservoirs, this only affects one brake system of one VCM, and the remaining brake systems function properly. Additionally, the reservoir and pump disposed within the VCM are more exposed to airflow, thereby reducing the chance of the fluid overheating.

Figure 3A:
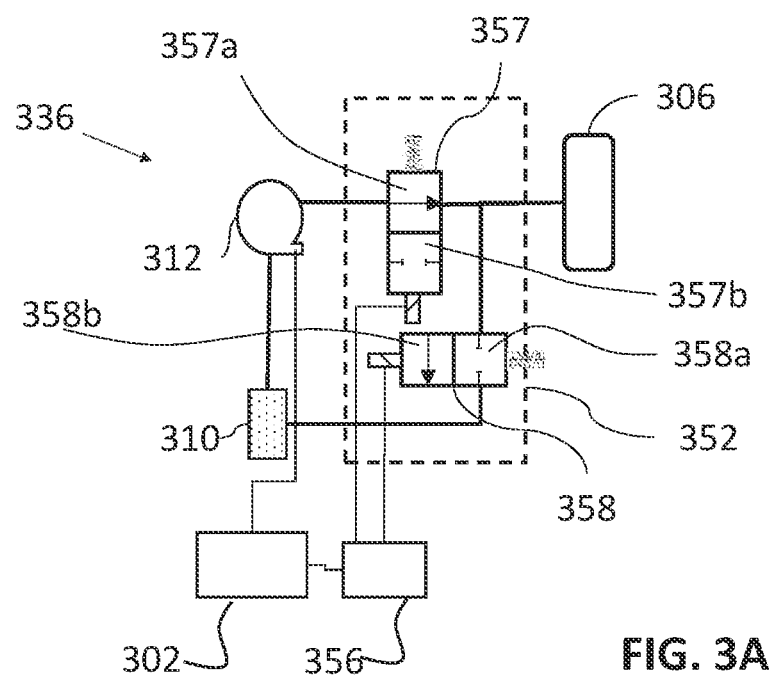
FIGS. 3A, 3B, and 3C are schematic block diagrams of a VCM-based brake system according to some embodiments of the disclosed technology.
Figure 3B:
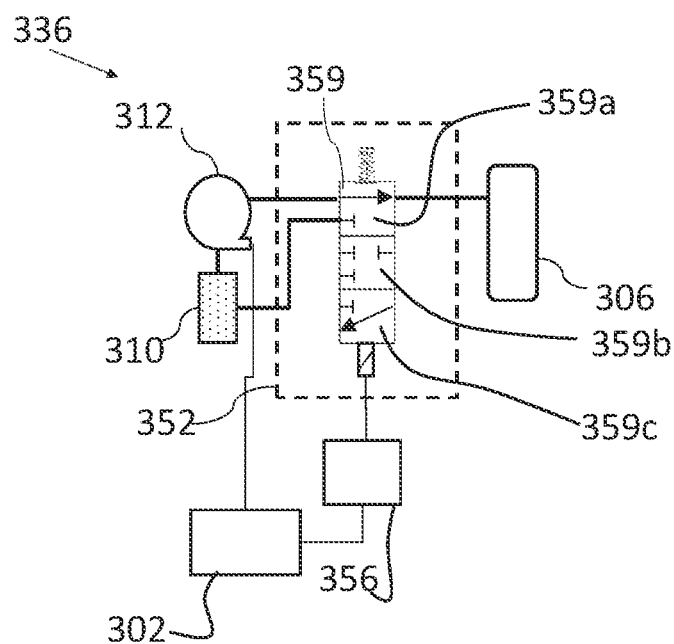
Figure 3C:
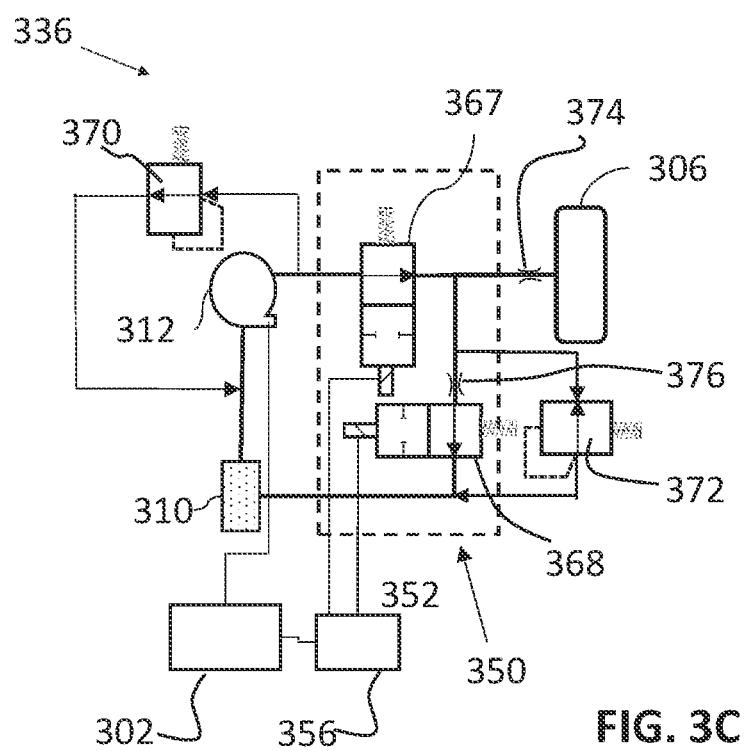

Referring now to FIGS. 3A, 3B, and 3C, which are schematic block diagrams of a VCM-based brake system 336, according to some embodiments of the disclosed technology. Brake system 336 may be an embodiment of hydraulic VCM-based brake system 236 described hereinabove with respect to FIG. 2, and may include similar components, subsystems, and functionalities.

As seen in FIG. 3A, hydraulic VCM-based brake system 336 includes a brake modulator 352, adapted to control the operation of brake actuator 306. In the illustrated embodiment, brake modulator 352 functions as a brake fluid supply modulator, and is adapted to modulate the supply of braking fluid to the brake actuator 306.

As discussed hereinabove, hydraulic VCM-based brake system 336 is adapted to be disposed in a VCM 20 (FIG. 1A), which is adapted to be mounted onto a vehicle platform 12 (FIG. 1A). The vehicle platform is adapted to have multiple VCMs attached thereto. As discussed herein, each VCM may include a dedicated VCM-based brake system, which may be independent of the vehicle platform and of the other VCMs. In some embodiments, each VCM-based brake system includes, or is functionally associated with, a dedicated brake modulator 352 as described herein. Typically, each modulator 352 is adapted to receive control inputs from a brake-control-circuit 302, similar to brake-control-circuit 202 of FIG. 2. Additionally or alternatively, one or more of the brake modulator 352 is adapted to receive control inputs from a central controller, such as control circuit 116 (FIGS. 1B and 2) of the vehicle.

In the embodiments shown in FIGS. 3A and 3B, brake system 336 includes, a single-channel modulator 352. Modulator 352 includes one or more modulator valves, as described herein, and one or more modulator control circuits 356 adapted to control the modulator valves.

In some embodiments, control of VCM 20 is by one or more VCM control loops. In some embodiments, the VCM control loops include a brake control loop. In some embodiments, the brake control loop includes brake controller 302 operating brake modulator 352, with respect to inputs received by brake controller 302. For example, inputs received by brake controller 302 may include a speed reduction input signal, and an ESC input signal. A speed reduction input signal may be initiated by a driver, for example depressing a brake signal or pressing a suitably configured brake button, or by an automated driving system identifying that speed reduction is required. An ESC input signal may be initiated, for example, for control of traction or stability, e.g. when road conditions are hazardous or when initial loss of control is identified.

In some embodiments, hydraulic VCM-based braking system 336 is a brake-by-wire system. In such embodiments, braking operations are actuated by an electrical input provided to the brake-control-circuit 302. The electrical input may be initiated by an automated system, for example by sensors identifying a need to slow down the vehicle. The electrical input may also be initiated by a driver, pressing a suitable brake button or depressing a brake pedal.

It is a feature of the present invention, that as a result of the decoupling of the brake system from the vehicle platform and the use of brake-by-wire functionality, even if the driver presses the brake pedal for an extended period, there is no locking of the brake. Consequently, in the embodiments shown in FIGS. 3A to 3C, the VCM-based braking system 336 does not require, and in some embodiments is devoid of, a master cylinder and/or a fluid accumulator upstream of the fluid pump, or altogether.

According to some embodiments, a single fluid pump 312 is adapted to generate fluid pressure for actuating brake actuator 306. This is particularly true when the braking operation is for the purpose of reducing the speed of the vehicle, or when regulating of the rotation rate of the wheel hub is initiated by a computing unit, such as an ESC functionality incorporated within brake modulator 352 or brake controller 302.

It is a particular feature of the disclosed technology that each brake modulator 352, which is disposed within VCM-based brake system 336, is smaller than a prior art ESC modulator used for typical ESC systems and provides at least the functionality of the typical ESC systems. Additionally, brake modulator 352 has a reduced number of valves relative to a prior art ESC modulator, and thus may also require simpler control logic. In some embodiments, brake modulator 352 may function as brake pressure modulator 214 of FIG. 2, the brake pressure modulator having one or more valves in fluid communication with brake actuator 306 to regulate fluid flow between the brake actuator 306, fluid source 310, and fluid pump 312.

Turning specifically to FIG. 3A, in some embodiments, brake modulator 352 includes two valves—a fluid inlet valve 357 and a fluid release valve 358. Each of valves 357 and 358 has an open operative orientation and a closed operative orientation. When in the open operative orientation, fluid inlet valve 357 is adapted to provide hydraulic fluid to, and increase the fluid pressure within, brake actuator 306. By contrast, fluid release valve 358 is adapted to release fluid from, and to reduce the fluid pressure within, brake actuator 306 when it is in the open operative orientation.

In some embodiments, fluid inlet valve 357 is a 2-port 2-way valve, having inlet and outlet ports, and two positions. In some embodiments, a first position 357a of inlet valve 357 is a pressure buildup position, in which a pressure source (e.g. fluid pump 312) is in fluid communication with brake actuator 306. In some embodiments, a second position 357b of inlet valve 357 is a pressure maintenance position, in which there is no fluid communication between the pressure source and brake actuator 306, preventing fluid from flowing between brake actuator 306 and fluid source 310.

In some embodiments, such as in the illustrated embodiment of FIG. 3A, inlet valve 357 is normally open, such that it is normally in the pressure buildup position 357a. In other embodiments, inlet valve 357 may be normally closed, such as it is normally in the pressure maintenance position 357b.

In some embodiments, fluid release valve 358 is a 2-port 2-way valve, having inlet and outlet ports, and two positions. In some embodiments, a first position 358a of fluid release valve 358 is a pressure maintenance position, in which there is no fluid communication between brake actuator 306 and fluid source 310, preventing fluid from flowing towards fluid source 310. In some embodiments, a second position 358b of release valve 358 is a pressure release position, in which brake actuator 306 is in fluid communication with fluid source 310, and fluid can flow from the brake actuator to the reservoir. In some embodiments, fluid release valve 358 is normally closed, such that it is normally in the pressure maintenance position 358a.

In some embodiments, valves 357 and 358 are transitioned between the open operative orientation and the closed operative orientation by solenoids. In some embodiments, modulator-control-circuit(s) 356 is connected to, or functionally associated with, the solenoids controlling operation of valves 357 and 358 and synchronizes their operation. In some embodiments, valves 357 and 358 are proportional valves.

Turning now to FIG. 3B, it is seen that in some embodiments, brake modulator 352 includes a single valve 359, adapted to control fluid communication from the pressure source (e.g. fluid pump 312) to brake actuator 306, and flow of fluid between brake actuator 306 and fluid source, or reservoir, 310.

In some embodiments, valve 359 is a 3-port 3-way valve having three ports and three positions. In some embodiments, a first position 359a of valve 359 is a pressure buildup position, in which pressure source 312 is in fluid communication with brake actuator 306. In some embodiments, a second position 359b of valve 359 is a pressure maintenance position, in which there is no fluid communication between pressure source 312 and brake actuator 306, and fluid is prevented from flowing towards brake actuator 306 and fluid source 310. In some embodiments, a third position 359c of valve 359 is a pressure release position, in which brake actuator 306 is in fluid communication with fluid source 310, and fluid can flow from the brake actuator to the reservoir.

In some embodiments, valve 359, and the transition thereof between the three positions, is controlled by one or more solenoids. In some embodiments, modulator-control-circuit(s) 356 is connected to, or functionally associated with, the solenoid(s) controlling operation of valve 359 to regulate its operation. In some embodiments, valve 359 is a proportional valve.

The embodiment shown in FIG. 3C is similar to the embodiment of FIG. 3A, having different normal orientations of the valves, and additionally including pressure release valves and/or throttles. As seen in FIG. 3C, brake modulator 352 includes two valves—a fluid inlet valve 367 and a fluid release valve 368. Each of valves 367 and 368 has an open operative orientation and a closed operative orientation. When in the open operative orientation, fluid inlet valve 367 is adapted to provide hydraulic fluid to, and increase the fluid pressure within, brake actuator 306. By contrast, fluid release valve 368 is adapted to release fluid from, and to reduce the fluid pressure within, brake actuator 306 when it is in the open operative orientation.

In some embodiments, fluid inlet valve 367 is a 2-port 2-way valve, having inlet and outlet ports, and two positions, as described hereinabove with respect to fluid inlet valve 357 of FIG. 3A. In some embodiments, such as in the illustrated embodiment of FIG. 3C, inlet valve 367 is normally open, as described hereinabove with respect to FIG. 3A.

In some embodiments, fluid release valve 368 is a 2-port 2-way valve, having inlet and outlet ports, and two positions, as described hereinabove with respect to fluid release valve 358 of FIG. 3A. In the illustrated embodiment, fluid release valve 368 is normally open.

As seen in FIG. 3C, in some embodiments, a pressure relief valve 370 is disposed between fluid pump (i.e. pressure source) 312 and fluid inlet valve 367, to release any excess pressure provided via the pump, prior to it being delivered to the brake actuator 306 via valve 367. Fluid delivered by pressure relief valve 370 is returned to a fluid line down stream of reservoir 310 and upstream of fluid pump 312, for future use. In the illustrated embodiment, pressure relief valve 370 is normally open. However, in some embodiments, pressure relief valve 370 may be normally closed.

In some embodiments, a pressure relief valve 372 is disposed between brake actuator 306 and fluid release valve 368. Fluid delivered by pressure relief valve 372 is returned to a fluid line connecting reservoir 310, downstream of fluid release valve 368. In the illustrated embodiment, pressure relief valve 372 is normally closed. However, in some embodiments, pressure relief valve 372 may be normally open.

In some embodiments, a throttle 374 may be disposed between fluid inlet valve 367 and brake actuator 306, to further restrict the flow rate of fluid from valve 367 to the brake actuator. In some embodiments, a throttle 376 may be disposed between fluid brake actuator 306 and fluid release valve 368, to further restrict the flow rate of fluid from the brake actuator to the fluid release valve.

In some embodiments, valves 367, 368, 370, and/or 372 may be transitioned between the open operative orientation and the closed operative orientation by solenoids. In some embodiments, modulator-control-circuit(s) 356 is connected to, or functionally associated with, the solenoids controlling operation of valves 367, 368, 370, and 372 and synchronizes their operation. In some embodiments, valves 367, 368, 370 and/or 372 are proportional valves.

As described hereinabove with respect to FIG. 2, in some embodiments, a VCM including the VCM-based brake systems 336 of FIGS. 3A to 3C may include a VCM controller 38, as shown in FIG. 1. In some embodiments, wheel rotation profile inputs are received by the VCM controller, which provides operational instruction inputs to one or more of brake controller 302 and modulator-control-circuit(s) 356.

According to some embodiments, an electrical power source powering one or more of fluid pump 312, modulator-control-circuit(s) 356, and brake controller 302, may be mounted onto the vehicle platform, such as platform 12 of FIG. 1. In some embodiments, the electrical power source of one or more of pump 312, modulator-control-circuit(s) 356, and brake controller 302 may be disposed within the VCM, such as VCM 20 of FIGS. 1A and 1B. In some embodiments, one or more of pump 312, modulator-control-circuit(s) 356, and brake controller 302 share a common electrical power source.

It is a particular feature of embodiments of the disclosed technology, which include a VCM-based brake control and VCM-based ESC functionality, that the brake or ESC functionality can be added to or removed from a wheel axle, without altering the vehicle platform. For example, ESC functionality may be activated or de-activated on specific track axles, may be operated when one corner has some errors, or may be used to diagnose procedures that require de-activation of some of the VCMs.

In some embodiments, the VCM, such as the VCM controller or another circuit of the VCM, reports to a central controller of the vehicle platform, such as control circuit(s) 116 (see FIGS. 1B and 2), a user interface, or an alert system of the vehicle, an operational state of the brake functionality and/or of the ESC functionality in each VCM.

In some embodiments of the disclosed technology, brake and/or ESC functionalities may be provided by intercommunication between VCMs of the vehicle. In some embodiments, intercommunication between VCMs 20 occurs via VCM controllers 38 communicating with one another. In some embodiments, intercommunication between VCMs 20 is via bus 119 (see FIG. 2), which extends between the VCMs, via vehicle platform 12. In some embodiments, intercommunication between VCMs 20 is via a VCM-VCM bus (not explicitly shown), which is disconnected from vehicle controller 116 on the vehicle platform.

In some embodiments, the communication between the VCMs occurs without involving, or communicating with, vehicle controller 116 or another device disposed on the vehicle platform. In some embodiments, vehicle platform 12 (FIGS. 1A, 1B, 2) is devoid of an ESC system and/or of an ESC controlling unit.

In some embodiments, communication between the VCMs is complemented by communication of one or more of the VCMs with an external computing device (not explicitly shown). For example, in a fully or partially autonomous vehicle, the VCMs may communicate with an external controlling server.

In some embodiments, intercommunication between VCMs includes intercommunication between brake controllers disposed in different VCMs of the vehicle. Data exchange between the VCMs may improve the ESC performance, for example by sharing among VCMs data relating to the types of the VCMs, data relating to VCM subsystems installed on each VCM, the status of such subsystems, historical data relating to functionalities of each VCM, data relating to load on each VCM, and the like. In some embodiments, brake modulators 352 are controlled solely by components of brake modules 350 at the VCM(s), without receiving control signals from the vehicle controller 116 or from another controller disposed on the vehicle platform.

Communication between mounted VCMs may be between two VCMs on the same side of the vehicle, whether by vertical division (right VCMs, left VCMs) or by horizontal division (front VCMs, rear VCMs). In some embodiments, all four VCMs may communicate with each other.

Exemplary Method of Operating a Hydraulic VCM-Based Brake System

Figure 4:
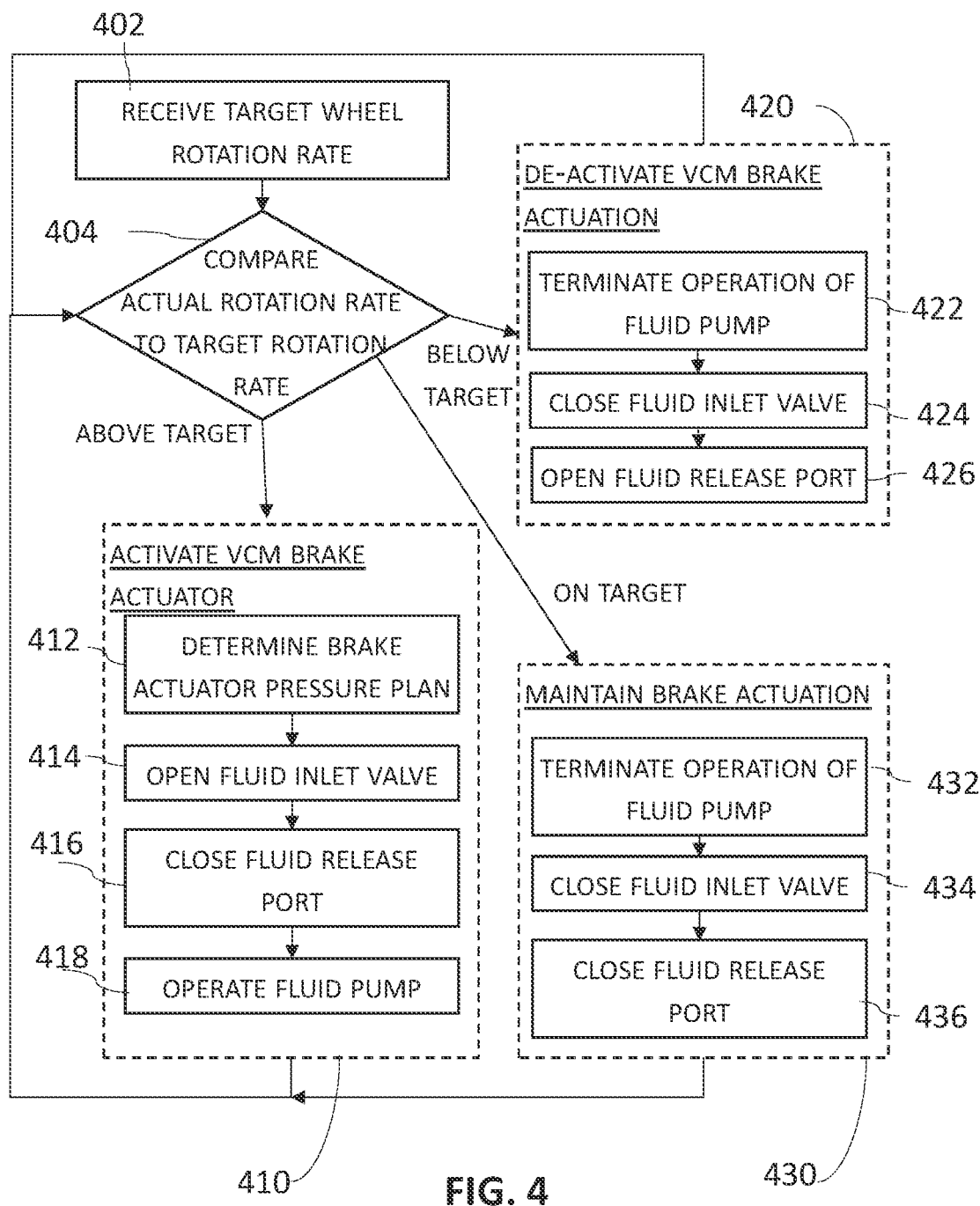
FIG. 4 is a flowchart of a method of operating a hydraulic VCM-based brake system, according to some embodiments of the disclosed technology.

Reference is now made to FIG. 4, which is a flowchart of a method for operating a hydraulic VCM-based brake system, such as VCM-based brake systems 236 and 336 of FIGS. 1B to 3C, according to some embodiments of the disclosed technology.

As seen in FIG. 4, initially, a target wheel rotation rate is obtained at step 402. In some embodiments, the target wheel rotation rate is obtained by a VCM controller, such as controller 38 of FIG. 1B, or by a brake-control-circuit, such as brake-control-circuits 202 or 302 of FIGS. 2 to 3C, disposed within the VCM. In some embodiments, the target rotation rate is obtained from another component of the vehicle, such as from a brake pedal or button electrically associated with the VCM-based brake system, or from a vehicle controller such as vehicle controller 116 (FIG. 2).

In some embodiments, the target rotation rate is lower than a current rotation rate. In such embodiments, the target rotation rate is intended to slow the speed of the vehicle, or to correct vehicle yaw in accordance with instruction inputs received from an ESC/ESP system. In some embodiments, the target rotation rate is higher than a current rotation rate. In such embodiments, the target rotation rate is intended to terminate a braking operation and/or to cause acceleration of the vehicle.

At step 404, the actual, or current, wheel rotation rate is compared to the obtained target rotation rate. In some embodiments, the comparing is carried out by the VCM controller or by the brake-control-circuit disposed within the VCM. In some embodiments, the actual wheel rotation rate is measured by, or obtained from, a rotation rate sensor, such as sensor 104 (FIG. 1B) disposed within the VCM.

In some embodiments, as part of step 404, a pressure applied by a brake actuator, such as brake actuator 206 or 306 (FIGS. 2 to 3C) is measured. In such embodiments, the comparison is between the actual pressure applied by the brake actuator and a target pressure to be applied by the brake actuator. In some embodiments, the pressure applied by the brake actuator is pressure applied by the actuator on a brake disc/drum.

When the comparison at step 404 reveals that the actual wheel rotation rate is higher than the target wheel rotation rate, VCM-based brake system carried out operations to reduce the actual rotation rate, included in step block 410 which relates to activation of a VCM-based brake actuator.

When the comparison at step 404 reveals that the actual wheel rotation rate is below the target wheel rotation rate, VCM-based brake system carried out operations to enable the increase of the actual rotation rate, included in step block 420 which relates to deactivation of a VCM-based brake actuator. When the comparison at step 404 reveals that the actual wheel rotation rate is on target, VCM-based brake system carried out operations to maintain the actual rotation rate, included in step block 430.

As seen in FIG. 4, step block 410 relates to activation of the VCM-based brake actuator, such as brake actuators 206 or 306 (FIGS. 2 to 3C). At step 412, a brake actuator pressure plan or profile of the brake actuator is determined. For example, the pressure plan may include a pressure plan within the actuator, the duration of actuation, the pressure pulse rate, and the like. At step 414 a fluid line between the brake actuator and a fluid source, such as reservoir 210 or 310 (FIGS. 2 to 3C), and/or a fluid pump, such as pump 212 or 312 (FIGS. 2 to 3C), is opened, or is maintained open. In some embodiments, opening of the fluid line is accomplished by controlling a fluid inlet valve or port disposed between the brake actuator and the reservoir, such as valves 357, 359, or 367 (FIGS. 3A to 3C) to be in an open operative orientation. As such, fluid pressure may be supplied from the fluid source and/or the fluid pump to the brake actuator.

At step 416, a fluid line between the brake actuator and the fluid source is closed, or is to kept closed. According to some embodiments, closing of the fluid line is accomplished by closing a release port, such as one of fluid release valves 358, 368 or a position of valve 359 (FIGS. 3A to 3C), located along the fluid line between the brake actuator and the fluid source, within the VCM. In some embodiments, closing of the fluid line is accomplished by setting a multi-states fluid release valve assembled within a pressure modulator of the VCM to a closed state, so as to prevent release of fluid pressure between the brake actuator and the fluid source within the VCM.

At step 418, the VCM-based fluid pump, e.g. pump 212 or 312 (FIGS. 2 to 3C) is operated, or is maintained in operation, to supply fluid pressure from the fluid source or reservoir toward the brake actuator. In some embodiments, operation of the fluid pump is regulated by a pump-control-circuit, which may form part of the brake-control-circuit or of the VCM controller. The pump-control-circuit may receive a target pressure, and may operate or terminate operation of the pump to achieve that target pressure.

It is appreciated that steps 412, 414, 416, and 418, within the step block 410, may be carried in a different order than that shown. For example, the opening of the fluid line at step 414 may take place after the closing of the fluid line at step 416, and/or after the operating of the fluid pump at step 418. As another example, the closing of the fluid line at step 416 may occur before the determining of the plan at step 412.

As mentioned above, step block 420 relates to deactivation of the VCM-based brake actuator. At step 422 the pumping operation of the VCM-based fluid pump is terminated, or, if the fluid pump was previously inactive, it is maintained in an inactive state. This prevents application of additional fluid pressure to the fluid line connecting the fluid pump and the brake actuator.

At step 424, the fluid line between the fluid pump and/or the fluid source within the VCM, and the brake actuator, is closed, or is kept closed. In some embodiments, closing of the fluid line is accomplished by controlling a fluid inlet valve or port located along the fluid line between the fluid pump and/or the fluid source and the brake actuator, such as valves 357, 359, or 367 (FIGS. 3A to 3C), to be in the closed operative orientation. In some embodiments, closing of the fluid line is accomplished by setting a fluid inlet valve within a pressure modulator of the VCM to a closed state, so as to close the fluid supply line and to prevent an increase in fluid pressure between the fluid source and the brake actuator.

At step 426, the fluid line between the brake actuator and the fluid source is opened, or is maintained open, to reduce fluid pressure in brake actuator. In some embodiments, opening of the fluid line is accomplished by opening a release port, such as one of fluid release valves 358, 368 or a position of valve 359, located along the fluid line between the brake actuator and the fluid source, within the VCM. In some embodiments, opening of the fluid line is accomplished by setting the fluid release valve of a pressure modulator of the VCM to an open state, such that the fluid line is open to allow releasing of fluid pressure from the brake actuator toward the fluid source.

It is appreciated that steps 422, 424, and 426, within the step block 420, may be carried out in a different order than that shown. For example, the closing at step 424 and/or the opening at step 426 may occur prior to the terminating at step 422.

As mentioned above, step block 430 relates to maintaining the operation of the VCM-based brake actuator. At step 432, the pumping operation of the VCM-based fluid pump is terminated, or, if the fluid pump was previously inactive, it is maintained in an inactive state. This prevents application of additional fluid pressure to the fluid line connecting the fluid pump and the brake actuator.

At step 434, the fluid line between the fluid pump and/or the fluid source within the VCM, and the brake actuator, is closed, or is kept closed. In some embodiments, closing of the fluid line is accomplished by controlling a fluid inlet valve or port located along the fluid line between the fluid pump and/or the fluid source and the brake actuator, such as valves 357, 359, or 367 (FIGS. 3A to 3C), to be in the closed operative orientation. In some embodiments, closing of the fluid line is accomplished by setting a fluid inlet valve within a pressure modulator of the VCM to a closed state, so as to close the fluid supply line and to prevent an increase in fluid pressure between the fluid source and the brake actuator.

At step 436, the fluid line between the brake actuator and the fluid source is closed, or is kept closed. In some embodiments, closing of the fluid line is accomplished by closing a release port such as one of fluid release valves 358, 368 or a position of valve 359 (FIGS. 3A to 3C), located along the fluid line between the brake actuator and the fluid source, within the VCM. In some embodiments, closing of the fluid line is accomplished by setting a multi-state fluid release valve assembled within a pressure modulator of the VCM to a closed state, so as to prevent release of fluid pressure between the brake actuator and the fluid source, within the VCM.

It is appreciated that steps 432, 434, and 436, within the step block 430, may be carried out in a different order than that shown. For example, the closing at steps 434 and/or 436 may occur prior to the terminating at step 432.

In some embodiments, one or more of the operations carried out in steps of activating step block 410 (i.e. steps 412, 414, 416, and/or 418), de-activating step block 420 (i.e. steps 422, 424, and/or 426), and/or maintaining step block 430 (i.e. steps 432, 434, and/or 436) is regulated by the brake-control-circuit of the VCM-based brake system, such as brake-control-circuit 202 or 302.

In some embodiments, following completion of any one of the step blocks 410, 420, and/or 430, flow returns to step 404, to repeat the comparison of the actual rotation rate and the target rotation rate, for another iteration of the method of FIG. 4.

Fluid Pressure Controlled Hydraulic VCM-Based Brake System

Figure 5A:
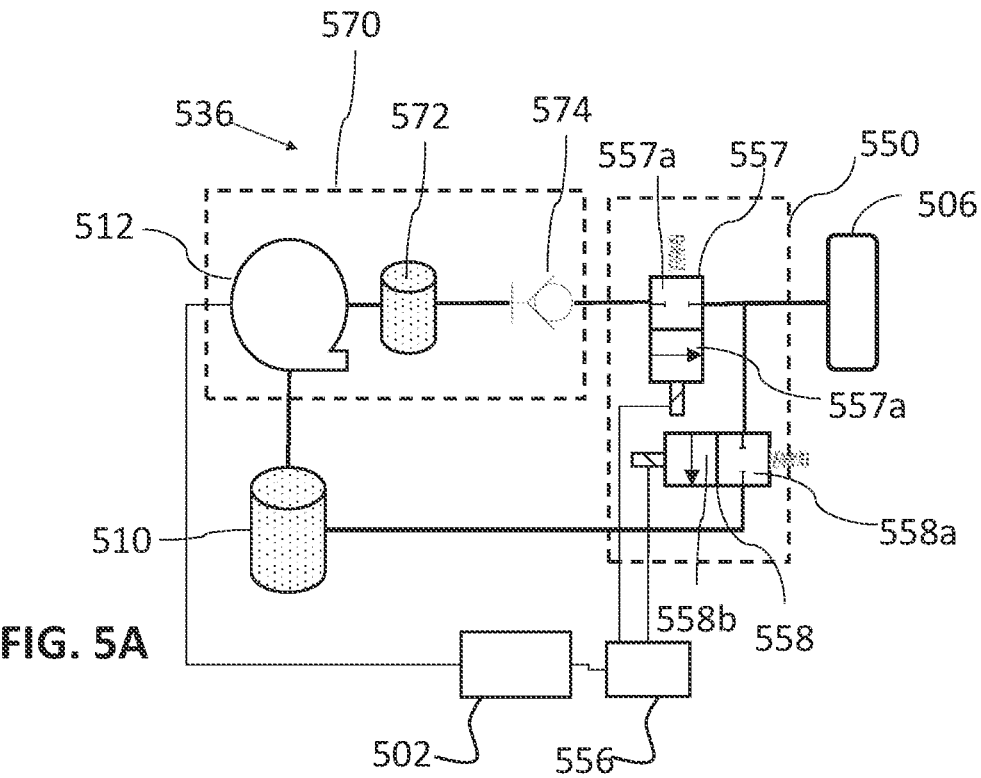
FIGS. 5A and 5B are, respectively, mechanical and electrical schematic block diagrams of a VCM-based brake system functionally associated with, or including, a VCM-pressure modulator, according to some embodiments of the disclosed technology.
Figure 5B:
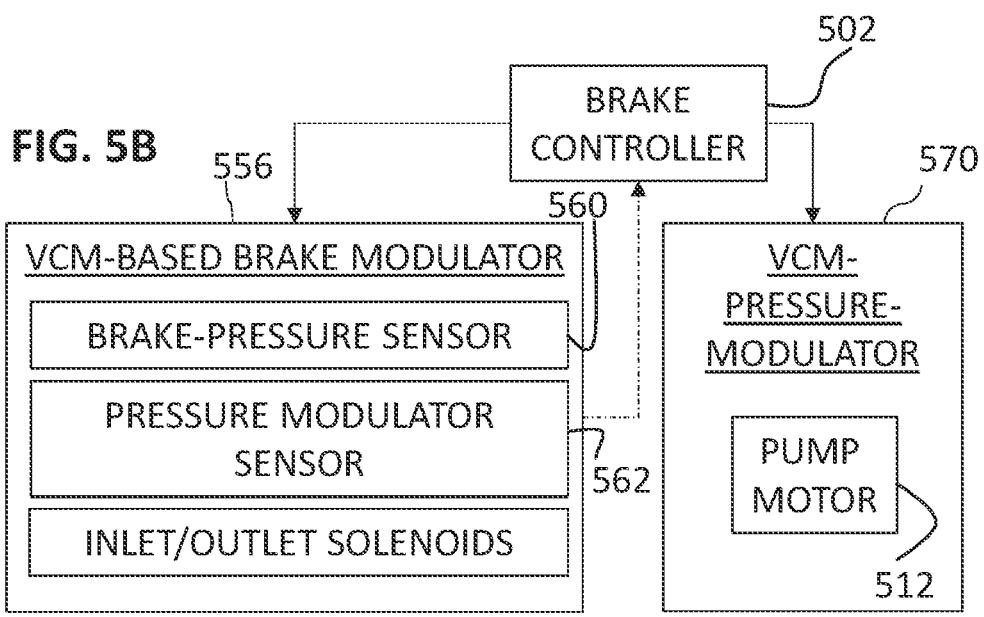

Reference is now made to FIGS. 5A and 5B which are mechanical and electrical schematic block diagrams of a VCM-based brake system 536 functionally associated with, or including, a VCM-based brake-modulator 550 and with a VCM-pressure-modulator 570, according to some embodiments of the disclosed technology. Hydraulic VCM-based brake system 536, brake-modulator 550, and pressure-modulator 570 are disposed within a VCM 20, similar to that described hereinabove with respect to FIG. 1A. FIG. 5A illustrates only the VCM-based brake system. However, it is appreciated that the system illustrated in FIG. 5A would be disposed within a VCM, as shown in FIGS. 1B and 2.

Hydraulic VCM-based brake system 536 may be an embodiment of hydraulic VCM-based brake systems 336 described hereinabove with respect to FIGS. 3A to 3C, and may include similar components, subsystems, and functionalities.

As seen in FIG. 5A, hydraulic VCM-based brake system 536 includes a VCM-based brake-modulator 550, similar to the brake modulator of FIGS. 3A to 3C, which is adapted to control operation of brake actuator 506. In the illustrated embodiment, VCM-based brake-modulator 550 is functionally associated with a VCM-pressure-modulator 570 which functions as the brake-power source, and is adapted to modulate the pressure of the braking fluid supplied to the brake actuator 506.

As discussed hereinabove, hydraulic VCM-based brake system 536 is adapted to be disposed in a VCM 20 (FIG. 1A), which is adapted to be mounted onto a vehicle platform 12 (FIG. 1A). The vehicle platform is adapted to have multiple VCMs attached thereto. As discussed herein, each VCM may include a dedicated VCM-based brake system, which may be independent of the vehicle platform and of the other VCMs. In some embodiments, each VCM-based brake system includes, or is functionally associated with, a dedicated VCM-based brake-modulator 550 as described herein. Typically, one or more of the VCM-based brake-modulator 550 is adapted to receive control inputs from a central controller, such as control circuit 116 (FIGS. 1B and 2) of the vehicle. In some embodiments, each VCM-based brake-modulator 550 is additionally or alternatively adapted to receive control inputs from a brake-control-circuit 502, similar to brake-control-circuit 202 of FIG. 2.

In some embodiments, VCM-based brake-modulator 550 is adapted to be integrated with, or form part of, brake-control-circuit 502. Consequently, one or more modulator-control-circuit(s) 556 of the brake-modulator may be integrated within brake-control-circuit 502.

In some embodiments, VCM-pressure-modulator 570 includes a fluid pump 512, which is adapted to generate fluid pressure for actuating brake actuator 506. Fluid pump 512 is in fluid communication with reservoir 510, and is associated with accumulator 572, which forms part of the VCM-pressure-modulator 570 and is disposed downstream of pump 512. Pump 512 is adapted to generate fluid at a target pressure, which pressurized fluid is accumulated within accumulator 572. In some embodiments, a no-return valve 574 forms part of VCM-pressure-modulator 570 and is disposed on a fluid line connecting accumulator 572 with the VCM-based brake-modulator 550, and ensures that fluid will only flow from the accumulator toward the brake actuator, but not in the opposite direction.

VCM-based brake-modulator 550 includes modulator valves, adapted to be controlled by modulator-control-circuit 556. As seen in FIG. 5A, VCM-based brake-modulator 550 includes two valves—a fluid inlet valve 557 and a fluid release valve 558. However, valves 557 and 558 may be replaced by a single 3-position valve, substantially as described hereinabove with respect to FIG. 3B.

Each of valves 557 and 558 has an open operative orientation and a closed operative orientation. When in the open operative orientation, fluid inlet valve 557 is adapted to provide hydraulic fluid to, and increase the fluid pressure within, brake actuator 506. By contrast, fluid release valve 558 is adapted to release fluid from, and to reduce the fluid pressure within, brake actuator 506 when it is in the open operative orientation.

In some embodiments, fluid inlet valve 557 is a 2-port 2-way valve, having inlet and outlet ports, and two positions. In some embodiments, a first position 557a of inlet valve 557 is a pressure buildup position, in which accumulator 572 is in fluid communication with brake actuator 506, via no-return valve 574 and inlet valve 557. In some embodiments, a second position 557b of inlet valve 557 is a pressure maintenance position, in which there is no fluid communication between the pressure source and brake actuator 506, preventing fluid from flowing between brake actuator 506 and fluid source 510.

In some embodiments, such as in the illustrated embodiment of FIG. 5A, inlet valve 557 is normally closed, such that it is normally in the pressure maintenance position 557b.

In some embodiments, fluid release valve 558 is a 2-port 2-way valve, having inlet and outlet ports, and two positions. In some embodiments, a first position 558a of fluid release valve 558 is a pressure maintenance position, in which there is no fluid communication between the brake actuator 506 and the fluid source, preventing fluid from flowing towards fluid source 510. In some embodiments, a second position 558b of release valve 558 is a pressure release position, in which brake actuator 506 is in fluid communication with fluid source 510, and fluid can flow from the brake actuator to the reservoir. In some embodiments, fluid release valve 558 is normally closed, such that it is normally in the pressure maintenance position 558a.

In some embodiments, valves 557 and 558 are transitioned between the open operative orientation and the closed operative orientation by solenoids. In some embodiments, modulator-control-circuit(s) 556 is connected to, or functionally associated with, the solenoids controlling operation of valves 557 and 558 and synchronizes their operation. In some embodiments, valves 557 and 558 are proportional valves.

In some embodiments (not shown), no-return valve 574 forms part of brake-modulator 550 and is disposed on a fluid line connecting the VCM-based brake-modulator 550 with VCM-pressure-modulator 570. In such embodiments, no-return valve 574 ensures that fluid will only flow from the VCM-pressure-modulator 570 toward the brake actuator 506, but not in the opposite direction.

As shown in FIG. 5B, and as described hereinabove with respect to FIG. 2, in some embodiments, the brake controller 502 provides power and control inputs to VCM-based brake-modulator 550 and/or to VCM-pressure-modulator 570, as indicated by solid lines in FIG. 5B, and may receive sensor readings from components of the VCM-based brake modulator, as indicated by a dashed line in FIG. 5B. For example, the VCM-based brake modulator 550 may include a brake-pressure-sensor 560 adapted to sense the pressure applied by the brake actuator, such as by a brake caliper. As another example, VCM-based brake to modulator 550 may include an actuator-fluid-pressure-sensor adapted to sense the pressure of the fluid provided to the brake actuator. As another example, VCM-based brake modulator 550 may include a pressure-modulator-sensor 562 adapted to sense the pressure of the fluid supply provided to the VCM-based brake modulator from VCM-pressure-modulator 570. Inputs representing measurements or signals of the sensors 560 and/or 562 may be provided from the VCM-based brake modulator to brake controller 502.

In some embodiments, the VCM including the VCM-based brake systems 536 may further include a VCM controller, similar to the VCM controller 38 shown in FIG. 1A. In some embodiments, the VCM-based brake modulator and/or the VCM-pressure-modulator may be controlled by the VCM controller.

According to some embodiments, an electrical power source powering one or more of VCM-pressure modulator 570, and specifically pump 512, components of VCM-based brake modulator 550, brake controller 502, and/or VCM controller 538 may be mounted onto the vehicle platform, such as platform 12 of FIG. 1. In some embodiments, the electrical power source may be disposed within the VCM, such as VCM 20 of FIGS. 1A and 1B. In some embodiments, one or more of VCM-pressure modulator 570, and specifically pump 512, components of VCM-based brake modulator 550, brake controller 502, and/or VCM controller 538 may share a common electrical power source.

In some embodiments, the VCM, such as VCM controller 538 or another circuit of the VCM, reports to a central controller of the vehicle platform, such as control circuit(s) 116 (see FIGS. 1B and 2), a user interface, or an alert system of the vehicle, an operational state of VCM-pressure modulator 570 and/or of VCM-based brake modulator 550.

As discussed hereinabove with respect to FIGS. 3A to 3C, also in the embodiment of FIGS. 5A and 5B, the VCMs may communicate with one another, wirelessly, via a bus, which may be mounted on the vehicle platform or external thereto, or via an external computing device such as a cloud based computer.

Exemplary Method of Operating a Hydraulic VCM-Based Brake System with an Accumulator Reference is now made to FIGS. 6A and 6B, which together are a flowchart of a method for operating a hydraulic VCM-based brake system including or associated with a VCM-pressure modulator and/or a VCM-based brake modulator, such as VCM-based brake system 536 of FIGS. 5A and 5B, according to some embodiments of the disclosed technology.

As seen in FIG. 6A, initially at step 600, pressure is built up in an accumulator disposed downstream a fluid pressure pump, such as accumulator 572 (FIG. 5A), by operation of the VCM-pressure-modulator activating a fluid pump thereof, such as (fluid pump 512). The pressurized fluid in accumulator 572 is stored for future use, as explained hereinbelow.

A target fluid pressure required in the fluid supply line upstream of the brake actuator, such as brake actuator 506 (FIG. 5A) is obtained at step 602. In some embodiments, the target fluid pressure is obtained by a VCM controller, such as controller 538 (FIG. 5B), or by a brake-control-circuit, such as brake-control-circuits 502 (FIG. 5A), disposed within the VCM. In some embodiments, the target fluid pressure is obtained from another component of the vehicle, such as from a brake pedal or button electrically associated with the VCM-based brake system, or from a vehicle controller such as vehicle controller 116 (FIG. 2). In some embodiments, target fluid pressure is calculated or determined using callout tables based on a brake performance profile required by the brake actuator.

At step 604, the actual, or current, brake fluid pressure is compared to the obtained target pressure. In some embodiments, the comparing is carried out by the VCM controller or by the brake-control-circuit disposed within the VCM. In some embodiments, the actual pressure is measured by, or obtained from, a fluid pressure sensor, such as an actuator-fluid-pressure-sensor disposed upstream of the brake actuator. In some embodiments, the actual pressure is determined in accordance to measurements of the pressure applied by the actuator on a brake disc/drum.

When the comparison at step 604 reveals that the actual brake fluid pressure is higher than the target brake pressure, VCM-based brake system carried out operations to reduce the actual brake fluid pressure, included in step block 620 which relates to de-activation of a VCM-based brake actuator. When the comparison at step 604 reveals that the actual fluid brake pressure is below the target brake fluid pressure, VCM-based brake system carried out operations to increase the actual brake fluid pressure, included in step block 610 (FIG. 6B) which relates to activation of a VCM-based brake actuator. When the comparison at step 604 reveals that the actual brake pressure is on target, VCM-based brake system carried out operations to maintain the actual brake fluid pressure, included in step block 630.

As seen in FIG. 6B, step block 610 relates to activation of the VCM-based brake actuator, such as brake actuator 506 (FIG. 5A). At step 612, a brake fluid actuator pressure plan or profile of the brake actuator is determined. For example, the pressure plan may include a pressure plan within the actuator, the duration of actuation, a pressure pulse rate, and the like. At step 614 a fluid line between the brake actuator and a pressurized fluid source, such as accumulator 572 (FIG. 5A), and/or a fluid pump, such as pump 512 (FIG. 5A), is opened, or is maintained open. In some embodiments, opening of the fluid line is accomplished by controlling a fluid inlet valve disposed between the brake actuator and the reservoir, such as valves 557 (FIG. 5A) to be in an open operative orientation. As such, fluid pressure may be supplied from the accumulator to the brake actuator, without requiring pressurizing of the fluid when the braking command is received or the need for braking is identified. Having a pressurized fluid available may improve performance over systems requiring operating a fluid pump as pressurize fluid is required. Not requiring the activation of the pump may also result in a quieter brake system and increased durability of mechanical parts.

At step 616, a fluid line between the brake actuator and a fluid source, such as reservoir 510 (FIG. 5A) is closed, or is kept closed. According to some embodiments, closing of the fluid line is accomplished by closing a release port, such as one of fluid release valve 558 (FIG. 5A), located along the fluid line between the brake actuator and the fluid source, within the VCM. In some embodiments, closing of the fluid line is accomplished by setting the fluid release valve within a pressure modulator of the VCM to a closed state, so as to prevent release of fluid pressure between the brake actuator and the fluid source within the VCM.

At step 617, the actual, or current, pressure within the accumulator is compared to the target fluid pressure. In some embodiments, the comparing is carried out by the VCM controller or by the brake-control-circuit disposed within the VCM. In some embodiments, the actual pressure within the accumulator is measured by, or obtained from, a pressure sensor, such as pressure-modulator-sensor 562 (FIG. 5B) disposed within the VCM.

If the actual pressure within the accumulator is below the target fluid pressure, at step 618, the VCM-based fluid pump, such as pump 512 (FIG. 5A) is operated, or is maintained in operation, to supply pressurized fluid to the accumulator within the VCM-pressure modulator 570. In some embodiments, operation of the fluid pump is regulated by a pump-control-circuit, which may form part of the brake-control-circuit or of the VCM controller. The pump-control-circuit may receive a target pressure, and may operate or terminate operation of the pump to achieve that target pressure.

If the actual pressure within the accumulator is above, or on, the target pressure, at step 619, the pumping operation of the VCM-based fluid pump is terminated, or, if the fluid pump was previously inactive, it is maintained in an inactive state. This prevents increasing of the fluid pressure within the accumulator.

Once the steps in step block 610 have been completed, the flow may return to step 604 to repeat the comparison of the actual brake pressure and the target brake pressure, for another iteration of the method of FIGS. 6A and 6B.

It is appreciated that steps 612, 614, 616, and 617 within the step block 610, may be carried in a different order than that shown. For example, step 617 may occur right after step 612. As another example, step 616 may occur prior to step 614.

Returning to FIG. 6A, as mentioned above, step block 620 relates to deactivation of the VCM-based brake actuator. At step 622 the pumping operation of the VCM-based fluid pump is terminated, or, if the fluid pump was previously inactive, it is maintained in an inactive state. This prevents additional fluid pressure buildup within the accumulator, and application of pressurized fluid to the fluid line connecting the accumulator and the brake actuator.

At step 624, the fluid line between the accumulator within the VCM, and the brake actuator, is closed, or is kept closed. In some embodiments, closing of the fluid line is accomplished by controlling a fluid inlet valve or port located along the fluid line between the accumulator and the brake actuator, such as valve 557 (FIG. 5A), to be in the closed operative orientation.

At step 626, the fluid line between the brake actuator and the fluid source is opened, or is maintained open, to reduce fluid pressure in brake actuator. In some embodiments, opening of the fluid line is accomplished by opening a release port, such as fluid release valve 558, located along the fluid line between the brake actuator and the fluid source, within the VCM.

It is appreciated that steps 622, 624, and 626, within the step block 620, may be carried out in a different order than that shown. For example, the closing at step 624 and/or the opening at step 626 may occur prior to the terminating at step 622. Following completion of the steps in step block 620, the flow may return to step 604 to repeat the comparison of the actual brake pressure and the target brake pressure, for another iteration of the method of FIG. 6.

As mentioned above, step block 630 relates to maintaining the operation of the VCM-based brake actuator. At step 633, the fluid line between the brake actuator and the fluid source is closed, or is kept closed. In some embodiments, closing of the fluid line is accomplished by closing a release port such as fluid release valve 558 (FIG. 5A), located along the fluid line between the brake actuator and the fluid source, within the VCM.

At step 634, the fluid line between the accumulator and the brake actuator, is closed, or is kept closed. In some embodiments, closing of the fluid line is accomplished by controlling a fluid inlet valve or port located along the fluid line between the accumulator and the brake actuator, such as valve 557 (FIG. 5A), to be in the closed operative orientation.

The flow then may continue to step 617, in which the actual, or current, pressure within the accumulator is compared to the fluid target pressure, as described hereinabove.

If the actual pressure is below the target pressure, the flow continues to step 618, as described hereinabove. If the actual pressure is on target, the activation step block 630 is terminated.

Following completion or termination of the steps in step block 630, the flow may return to step 604 to repeat the comparison of the actual brake pressure and the target brake pressure, for another iteration of the method of FIG. 6.

In some embodiments, one or more of the operations carried out in steps of activating step block 610 (i.e. steps 612, 614, 616, 617, and/or 618), de-activating step block 620 (i.e. steps 622, 624, and/or 626), and/or maintaining step block 630 (i.e. steps 433, 434, and/or 437) is regulated by the brake-control-circuit of the VCM-based brake system, such as brake-control-circuit 502.

It is a particular feature of the VCM-based brake system of FIGS. 5A and 5B, and of the corresponding method of FIG. 6, that the pump 512 causes fluid in a target pressure to be accumulated in accumulator 572. As such, when a braking command is received, the fluid is already pressurized and ready for the brake actuator to apply the required pressure, as soon as the suitable valves open. By contrast, in the prior art, as well as in the embodiment of FIGS. 2 to 3C, the pump only initiates pressurizing of the fluid when the braking command is received, which may lead to a slower response time than in the embodiment of FIG. 5.

VMC-Based Brake System with Brake Regeneration

Figures 7A, 7B:
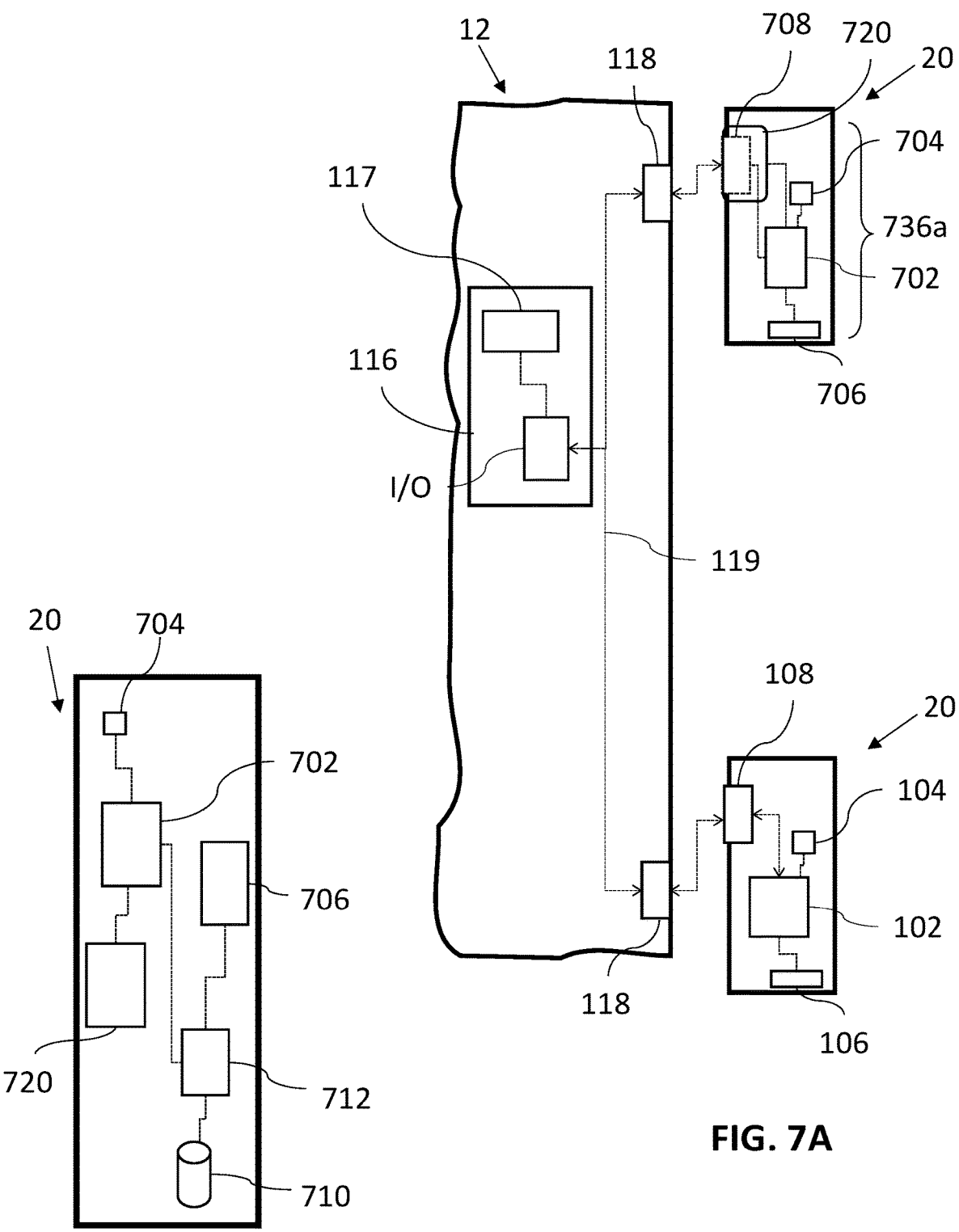
FIGS. 7A and 7B are schematic block diagrams of a VCM-based brake system having brake regeneration according to some embodiments of the disclosed technology.

Reference is now made to FIGS. 7A and 7B, which are schematic block diagrams of VCM-based brake systems 736a and 736b having brake regeneration according to some embodiments of the disclosed technology.

VCM-based brake systems 736a (FIG. 7A) and 736b (FIG. 7B) may be embodiments of VCM-based brake systems 36 and 236 of FIGS. 1B and 2, respectively, and are adapted to be accommodated within a VCM 20, between a vehicle platform 12 and a wheel 28 (see FIGS. 1B and 2) assembled to VCM 20.

VCM-based brake systems 736a and 736b each include a brake-control-circuit (e.g. one or more brake controller) 702, substantially as described hereinabove with respect to brake-control-circuits 102 and 202 of FIGS. 1B and 2. In some embodiments, the VCM-based brake systems further include a rotation rate sensor 704, adapted to report to the brake-control-circuit a rotation rate of a wheel attached to the VCM.

Each of VCM-based brake systems 736a and 736b includes a brake actuator (e.g. a brake caliper) 706, adapted to regulate the rotation rate of the wheel, based on actuation inputs received from brake-control-circuit 702 substantially as described hereinabove with respect to brake actuators 106 and 206 of FIGS. 1B and 2.

As described hereinabove with respect to FIG. 1B, VCM-based brake systems 736 may further include one or more brake power sources, disposed within VCM 20. The brake power source(s) is adapted to provide operational power to brake actuator 706 and/or to brake-control-circuit 702.

According to some embodiments, VCM-based brake systems 736 include one or more brake-interface-circuits 708 adapted to provide an interface between brake-control-circuit 702 and one or more vehicle control circuits mounted outside VCM 20, substantially as described hereinabove with respect to FIG. 1B. For example, brake-interface-circuit 708 may provide an interface with a general vehicle controller 116 mounted onto vehicle platform 12, which is functionally associated with, or includes, a processor 117. In some embodiments, brake-interface-circuit 708 form part of vehicle connection interface 24 (FIG. 1A). In some embodiments, brake-interface-circuit 708 is adapted to connect to a platform connector 118, which may form part of VCM-connection interface 14 (FIG. 1A) mounted onto vehicle platform 12. In some embodiments, brake-interface-circuit 708 includes one or more transmitters to establish wireless connection with circuits outside VCM 20, such as with a general vehicle controller mounted onto the vehicle platform.

According to some embodiments, vehicle platform 12 includes a plurality of platform connectors 118. In some embodiments, two or more of platform connectors 118 are interconnected by a platform-VCM bus 119. In some embodiments, platform-VCM bus 119 is used for communication between computing circuits assembled within multiple VCMs 20.

VCM-based brake systems 736b, shown in FIG. 7B, is a hydraulic brake system. As such, VCM-based brake systems 736b further includes a hydraulic fluid source 710, and a hydraulic fluid pump 712, substantially as described hereinabove with respect to FIG. 2.

VCM-based brake systems 736a and 736b each include a brake regeneration module 740. In some embodiments, brake regeneration module 740 is associated with a motor coupled to a wheel hub forming part of VCM 20, onto which the wheel is mounted. In some embodiments, brake regeneration module 740 may include a motor inverter connected to the motor. In some embodiments, brake regeneration module 740 may includes a motor control circuit connected to the motor inverter. In some embodiments, brake regeneration module 740 is adapted to regulate the kinematic behavior of the wheel by receiving operational signals to apply brake regeneration prior to operating brake actuator 706. The operational signals may be received at the motor inverter of the brake regeneration module.

In some embodiments, such as the embodiment of FIG. 7A, brake actuator 706 is electrical, and is powered by electrical power source. In some embodiments, the electrical power source is disposed within the VCM, which may enable the use of simpler power sources (e.g. batteries, capacitors) per VCM-based brake system than when using a central power source. Localized power sources may also improve a power performance profile of the vehicle and/or VCM, and may enable local charging of the VCM and a longer duration between charges. Use of local power sources may also reduce the complexity, capacity requirements, size, weight, cost, and/or production complexity of the power source(s) or power system mounted onto the vehicle platform.

In some embodiments, VCM-based brake systems 736a and 736b are adapted to regenerate the power sources. In some embodiments, the VCM-based brake systems regenerates power sources disposed within the VCM. In some embodiments, the VCM-based brake systems regenerate one or more power source(s) mounted onto the vehicle platform.

Exemplary Methods of Operating a VCM-Based Brake System with Brake Regeneration

Figure 8A:
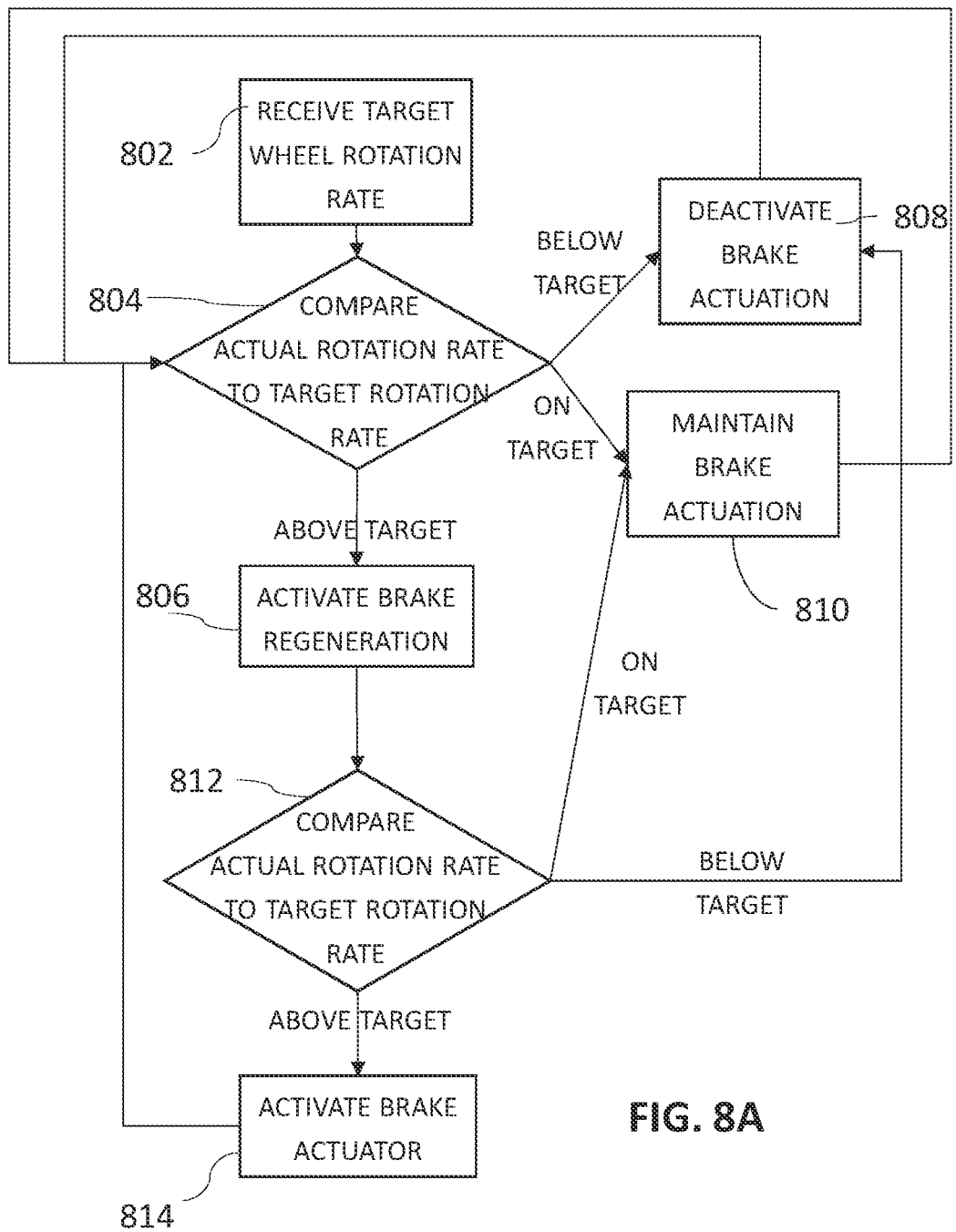
FIGS. 8A and 8B is are flowchart of methods for operating a VCM-based brake system having a brake regeneration functionality, according to some embodiments of the disclosed technology.
Figure 8B:
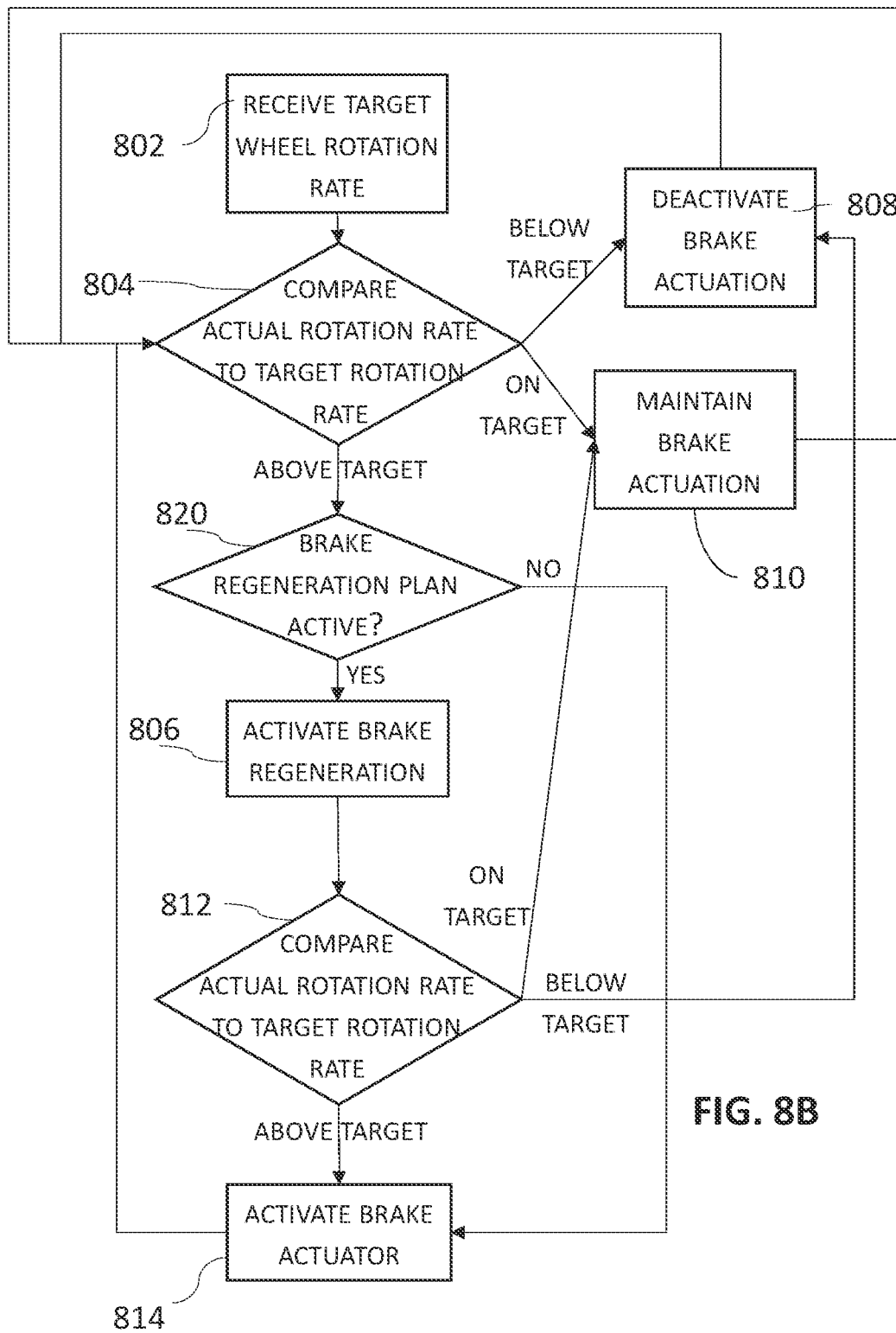

Reference is now made to FIGS. 8A and 8B, which are flowcharts of methods for operating a VCM-based brake system having brake regeneration functionality, according to some embodiments of the disclosed technology. The methods of FIGS. 8A and 8B may be implemented, for example, by such as VCM-based brake systems 736a and 736b of FIGS. 7A and 7B.

As seen in FIG. 8A, at an initial step 802, a target wheel rotation rate is received, for example as described hereinabove with respect to step 402 of FIG. 4. In some embodiments, the target rotation rate is lower than a current rotation rate. In such embodiments, the target rotation rate is intended to slow the speed of the vehicle, or to correct vehicle yaw in accordance with instruction inputs received from an ESC/ESP system. In some embodiments, the target rotation rate is higher than a current rotation rate. In such embodiments, the target rotation rate is intended to terminate a braking operation and/or to cause acceleration of the vehicle.

At step 804, the actual, or current, wheel rotation rate is compared to the obtained target rotation rate. In some embodiments, the comparing is carried out by the VCM controller or by the brake-control-circuit disposed within the VCM. In some embodiments, the actual wheel rotation rate is measured by, or obtained from, a rotation rate sensor, such as sensor 704, (FIG. 7A) disposed within the VCM.

When the comparison at step 804 reveals that the actual wheel rotation rate is below than the target wheel rotation rate, at step 808 VCM-based brake system carries out operations to increase the actual rotation rate, for example by deactivation of the VCM-based brake actuator (e.g. actuator 706 of FIGS. 7A and 7B). In some embodiments, the operations carried out at step 808 may be similar or equivalent to operations carried out in step block 420 of FIG. 4.

When the comparison at step 804 reveals that the actual wheel rotation rate is on target, at step 810 VCM-based brake system carries out operations to maintain the current brake actuation. In some embodiments, the operations carried out at step 810 may be similar or equivalent to operations carried out in step block 430 of FIG. 4.

When the comparison at step 804 reveals that the actual wheel rotation rate is higher than the target rotation rate, VCM-based brake system carries out operations to reduce the actual rotation rate. In some embodiments, reducing the actual rotation rate is by activating a brake regeneration module (module 740, FIGS. 7A and 7B) at step 806. The activated brake regeneration functionality is applied to a wheel motor, and results in reduction of the rotation rate of the wheel.

At step 812, following activation of the brake regeneration module, the actual wheel rotation rate is compared to the target regeneration rate once again. When the comparison at step 812 reveals that the actual rotation rate is below the target rotation rate, the flow continues to step 808, as discussed hereinabove. When the comparison at step 812 reveals that the actual rotation rate is on target, the flow continues to step 810, as discussed hereinabove. When the comparison at step 812 reveals that the actual rotation rate is still higher than the target rotation rate, the actual rotation rate may be further reduced is by activating the VCM-based brake actuator, at step 814. In some embodiments, the operations carried out at step 814 may be similar or equivalent to operations carried out in step block 410 of FIG. 4.

In some embodiments, step 804 is accomplished by comparing an actual pressure applied by a brake actuator to a target pressure, as described hereinabove with respect to FIG. 6.

In some embodiments, following completion of steps 808, 810, and/or 814, the flow returns to step 804 for comparison of the updated actual wheel rotation rate to the target rotation rate, and for another iteration of the method.

In some embodiments, operation of the VCM-based brake system may be defined in accordance with a VCM-plan. In some embodiments, the VCM-plan may define the operation of the brake regeneration module 740 (FIGS. 7A and 7B). For example, when the plan is active (e.g. purchased, payed for, and/or activated per vehicle type), the brake regeneration functionality can be used in conjunction with brake actuator. FIG. 8B illustrates a method similar to that of FIG. 8A, but differing therefrom in the existence of a plan for activation of brake regeneration, such that the brake regeneration functionality is only activated if the plan is active.

FIG. 8B initiates with steps 802 and 804, as described hereinabove with respect to FIG. 8A. Following the comparison at step 804, if the actual rotation rate is determined to be on target the flow continues to step 810, and if the actual rotation rate is determined to be below the target rotation rate, the flow continues to step 808, both as described hereinabove with respect to FIG. 8A.

Unlike the method of FIG. 8A, in FIG. 8B, when the comparison at step 804 indicates that the actual rotation rate is higher than the target rotation rate, at step 820 the VCM-based brake system evaluates whether it includes a brake regeneration plan, or if such a plan is active. If at step 820 it is determined that the VCM-based brake system includes a (active) brake regeneration plan, the flow continues to step 806, substantially as described hereinabove with respect to FIG. 8A. Otherwise, if no brake regeneration plan is included, or if such a plan is not active, the flow continues to step 814 for activation of the brake actuator, substantially as described hereinabove.

In some embodiments, the evaluation at step 820 is performed by a computing unit included in the VCM, such as the brake-control-circuit or the VCM controller. In some embodiments, the evaluation at step 820 is performed by a computing unit located on the vehicle platform, such as controller 116. In some embodiments, the evaluation at step 820 is performed by communication with a remote computer (e.g. a cloud based server).

The method of FIGS. 8A and 8B, relating to brake regeneration, are particularly useful in VCMs which include, in addition to the VCM-based brake system, a powertrain subsystem. In some embodiments, the VCM includes, in addition to the VCM-based brake system, also a steering system, such as steering system 32 of FIG. 1B. In some such embodiments, at step 812, if the actual rotation rate is still higher than the desired rotation rate, the steering system may be used to further reduce the rotation rate, for example by causing two opposing wheels to turn toward each other. Braking by steering may be used in conjunction with brake regeneration, or in a VCM which does not have a brake regeneration functionality.

In some embodiments, a VCM-based brake system plan is selected after connecting the VCM to the vehicle platform, for example by plug and play of the VCM. In some embodiments, the VCM-based brake system plan is selected in accordance with an insurance plan. In some embodiments, the VCM-based brake system plan is selected in accordance with a VCM service plan, where the VCM is provided as a service. In some embodiments, the VCM-based brake system plan is selected in accordance with a model of the vehicle. In some embodiments, the VCM-based brake system plan is selected in accordance with a type of the VCM, such as rear/front VCM, or motorized/not-motorized VCM. In some embodiments, the VCM-based brake system plan is selected in accordance with a preference of the driver or operator of the vehicle. In some embodiments, the VCM-based brake system plan is selected or terminated when the VCM is in diagnostic/test state, whether attached to or detached from the vehicle platform.

The vehicle platforms and VCMs discussed hereinabove form part of a vehicle. The vehicle may be for example, a private vehicle, a passenger car, a commercial vehicle, an autonomous, human driven, or remote controlled vehicle, a 4-wheeled car, a truck, a bus, and/or a trailer. In some vehicles, each VCM includes a VCM-based brake system.

In some vehicles, as shown for example in FIG. 7A, a front VCM and a rear VCM may have different types of VCM-based brake systems, which may differ in one or more of: a type of or structure brake actuator, a type or structure of brake-control-circuit, and operational profile defined for the brake system. In some vehicles, the front VCM and the rear VCM have different types of VCM-based brake systems, which may differ in one or more of: being hydraulic or non-hydraulic, a type of structure of brake actuator, a type or structure of brake controller, and/or an operational profile.

According to some embodiments, the type of a VCM-based brake system is defined by one or more characteristics. The characteristics may include, for example:

(1) Location of the VCM on the vehicle platform (e.g. front/rear corner/right side/left side);

(2) Brake actuator mechanism (e.g. mechanical, hydraulic, electrical, having a designated quality specifications);

(3) Brake actuator operational/performance profile (e.g. size, area of contact, response time);

(4) Brake controller feature(s) (e.g. operational functions, number of outputs, available inputs);

(5) Power source of one or more of the brake actuators and the brake-control-circuit; and (6) Mechanical/electrical interface for connection to the vehicle platform.

As mentioned hereinabove, in some embodiments, the braking functionality of vehicle speed reduction brake, for example by driver operated brake, is provided by activating the brake actuator without using a brake pedal.

General

It is expected that during the life of a patent maturing from this application many relevant brake actuators and brake-control-circuits will be developed. The scope of the terms brake actuators and brake-control-circuits are intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A Vehicle Corner Module (VCM) based brake system adapted to be between a wheel assembled to a VCM connectable to a vehicle platform, and the vehicle platform, the VCM-based brake system comprising:
   (a) a brake actuator, adapted to regulate the rotation rate of the wheel assembled to the VCM;
   (b) a fluid-based brake power source, mechanically and fluidly connected to the brake actuator and adapted to provide brake fluid for operating the brake actuator, including:
      (i) a brake fluid source storing the brake fluid; and
      (ii) a fluid pump disposed downstream of the brake fluid source in fluid communication with the brake fluid source and with the brake actuator;
   (c) a brake modulator in fluid communication with the brake actuator, the brake modulator adapted to regulate flow of the brake fluid between the brake actuator, the brake fluid source, and the fluid pump; and
   (d) a brake-control-circuit, functionally associated with the brake actuator and with the brake power source, and adapted to provide functional inputs to the brake actuator based on a target rotation rate profile desired for the wheel,
      wherein the brake actuator, the brake power source, the brake modulator, and the brake-control-circuit are disposed within the VCM between the wheel and the vehicle platform, and
      wherein the brake fluid source and the fluid pump disposed within the VCM are exposed to airflow.

2. The VCM-based brake system of claim 1, further comprising a brake-interface-circuit, adapted to facilitate communication between the brake-control-circuit and at least one computing unit external to the VCM.

3. The VCM-based brake system of claim 2, wherein the brake-interface-circuit is adapted to facilitate communication between the brake-control-circuit and a vehicle-control-circuit mounted onto the vehicle platform.

4. The VCM-based brake system of claim 2, wherein the brake-interface-circuit is adapted to facilitate communication between the brake-control-circuit and another control-circuit, external to the VCM.

5. The VCM-based brake system of claim 1, further comprising a speed-control-circuit including:
   a storage circuit adapted to store the target rotation rate profile desired for the wheel;
   a feedback loop adapted to compare a measured rotation rate profile of the wheel to the target rotation rate profile; and
   a communication interface functionally associated with the brake-control-circuit, adapted to provide the target rotation rate profile to the brake-control-circuit.

6. The VCM-based brake system of claim 1, wherein the fluid pump is adapted to regulate a fluid pressure of the brake fluid delivered from the brake fluid source to the brake actuator for actuation of the brake actuator.

7. The VCM-based brake system of claim 1, wherein the brake modulator includes at least one valve, wherein in at least one state of the valve, the valve is in fluid communication with the brake actuator.

8. The VCM-based brake system of claim 7, wherein the at least one valve comprises:
   a fluid inlet valve having at least one operative orientation adapted to allow flow of pressurized brake fluid from the fluid pump to the brake actuator; and
   a fluid release valve having at least one operative orientation adapted to allow release of brake fluid from the brake actuator toward the brake fluid source.

9. The VCM-based brake system of claim 7, wherein the at least one valve comprises a single valve having at least a fluid inlet operative orientation and a fluid release operative orientation, wherein in the fluid inlet operative orientation the single valve is adapted to allow flow of pressurized brake fluid from the fluid pump to the brake actuator, and in the fluid release operative orientation the single valve is adapted to allow release of brake fluid from the brake actuator toward the brake fluid source.

10. The VCM-based brake system of claim 7, wherein the brake modulator includes a brake actuator pressure sensor, adapted to sense a pressure applied by the brake actuator, and to provide readings of the sensed brake actuator pressure to the brake-control-circuit.

11. The VCM-based brake system of claim 7, wherein the brake modulator includes an actuator fluid pressure sensor, adapted to sense a pressure of fluid provided to the brake actuator, and to provide readings of the sensed fluid pressure to the brake-control-circuit.

12. The VCM-based brake system of claim 1, further comprising a brake regeneration module disposed within the VCM,
   wherein the brake-control-circuit is adapted to regulate activation of at least one of the brake regeneration module and the brake actuator.

13. A vehicle corner module (VCM) for regulating motion of a vehicle, comprising:
   a sub-frame including a wheel hub, adapted for mounting of the wheel thereon, and a vehicle-connection interface for connection of the sub-frame to a vehicle platform;
   a VCM-based brake system according to claim 1, mounted onto the sub-frame between the wheel hub and the connection interface; and
   a motor adapted to rotate the wheel,
   wherein the brake-control-circuit is configured to control a rotation rate of the wheel.

14. The VCM of claim 13, wherein a specific VCM is functionally mountable onto the vehicle platforms of at least two different vehicles, the at least two different vehicles being of two different types or of two different models.

15. A vehicle, comprising:
   a vehicle platform, having at least one Vehicle Corner Module (VCM)-connection interface for mechanical connection to a VCM;
   at least one VCM of claim 13, the vehicle-connection interface of the at least one VCM connected to the at least one VCM-connection interface.

16. The vehicle of claim 15, wherein the VCM-based brake system is a fluid operated VCM-based brake system, and the VCM-based brake system and the vehicle platform are not in fluid communication with each other.

17. The vehicle of claim 15, wherein:
   the vehicle platform includes a first VCM-connection interface and a second VCM-connection interface;
   the at least one VCM comprises a first VCM including a first VCM-based brake system and a first vehicle-connection interface connected to the first VCM-connection interface of the vehicle platform, and a second VCM including a second VCM-based brake system and a second vehicle-connection interface connected to the second VCM-connection interface of the vehicle platform;

the first VCM-based brake system is of a first type, and the second VCM-based brake system is of a second type, the second type being different from the first type.

18. The VCM-based brake system of claim 1, wherein the VCM-based brake system and the vehicle platform are not in fluid communication with each other.

19. The VCM-based brake system of claim 1, wherein the VCM-based system is mechanically decoupled from the vehicle platform.

20. The VCM-based brake system of claim 1, wherein the VCM-based brake system is devoid of a fluid accumulator in fluid communication with the fluid pump.

* * * * *